United States Patent
Mutschler

(10) Patent No.: US 9,678,811 B2
(45) Date of Patent: Jun. 13, 2017

(54) APPARATUS, METHOD AND COMPUTER PROGRAM FOR PROCESSING OUT-OF-ORDER EVENTS

(71) Applicant: FRAUNHOFER-GESELLSCHAFT ZUR FOERDERUNG DER ANGEWANDTEN FORSCHUNG E.V., Munich (DE)

(72) Inventor: Christopher Mutschler, Erlangen (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 14/763,685

(22) PCT Filed: Jan. 27, 2014

(86) PCT No.: PCT/EP2014/051538
§ 371 (c)(1),
(2) Date: Jul. 27, 2015

(87) PCT Pub. No.: WO2014/118132
PCT Pub. Date: Aug. 7, 2014

(65) Prior Publication Data
US 2015/0363245 A1    Dec. 17, 2015

(30) Foreign Application Priority Data

Jan. 31, 2013 (EP) .................................. 13153525

(51) Int. Cl.
G06F 9/54    (2006.01)
G06F 17/30   (2006.01)
(Continued)

(52) U.S. Cl.
CPC ............. *G06F 9/542* (2013.01); *G06F 9/544* (2013.01); *G06F 17/30516* (2013.01);
(Continued)

(58) Field of Classification Search
CPC ..... G06F 9/542; G06F 9/544; G06F 17/30516
See application file for complete search history.

(56) References Cited

U.S. PATENT DOCUMENTS 7,590,644 B2 * 9/2009 Matsakis ................... G06F 8/41
2005/0273772 A1 12/2005 Matsakis et al.
(Continued)

OTHER PUBLICATIONS

Brito et al, "Speculative Out-Of-Order Event Processing with Software Transaction Memory" (2008), Proceedings of the Second International Conference on Distributed Event-Based Systems, pp. 265-275 [retrieved from http://dl.acm.org/citation.cfm?id=1386023].*
(Continued)

*Primary Examiner* — Brian W Wathen
(74) *Attorney, Agent, or Firm* — Harness, Dickey & Pierce PLC

(57) ABSTRACT

Embodiments relate to a concept for ordering events of an event stream, comprising out-of-order events, for an event detector, wherein the events have associated thereto individual event occurrence times ($e_i \cdot ts$) and individual event propagation delays up to a maximum delay of K time units. Event received from the event stream are provided to an event buffer. Received events in the event buffer are ordered according their respective occurrence times to obtain ordered events. An ordered event ($e_i$) having an event occurrence time $e_i \cdot ts$ is speculatively forwarded from the event buffer to the event detector at an earliest time instant clk, such that $e_i \cdot ts + \alpha \cdot K \leq clk$, wherein $\alpha$ denotes a speculation quantity with $0 < \alpha < 1$.

20 Claims, 15 Drawing Sheets

(51) Int. Cl.
*H04W 4/00* (2009.01)
*H04L 29/08* (2006.01)

(52) U.S. Cl.
CPC ........ *G06F 17/30548* (2013.01); *H04L 67/12* (2013.01); *H04W 4/006* (2013.01); *G06F 2209/542* (2013.01)

(56) References Cited

U.S. PATENT DOCUMENTS

| | | | | |
|---|---|---|---|---|
| 2009/0125635 | A1* | 5/2009 | Barga | G06F 11/0793 709/231 |
| 2012/0066184 | A1* | 3/2012 | Barsness | G06F 17/30516 707/687 |
| 2014/0297800 | A1* | 10/2014 | Mutschler | G06F 9/4856 709/217 |

OTHER PUBLICATIONS

Li et al., "Out-of-Order Processing: A New Architecture for High-Performance Stream Systems" (Aug. 2008), Proceedings of the VLDB Endowment, pp. 274-288 [retrieved from http://dl.acm.org/citation.cfm?id=1453890].*

Maskey et al., "Replay-Based Approaches to Revision Processing in Stream Query Engines" (2008), Proceedings of the 2$^{nd}$ International Workshop on Scalable Stream Processing Systems, pp. 3-12 [retrieved from http://dl.acm.org/citation.cfm?id=1379276].*

Anicic et al., "Retractable Complex Event Processing and Stream Reasoning" (Jul. 2011), International Workshop on Rules and Rule Markup Languages for the Semantic Web, pp. 122-137 [retrieved from http://link.springer.com/chapter/10.1007%2F978-3-642-22546-8_11].*

Mutschler et al., "Distributed Low-Latency Out-of-Order Event Processing for High Data Rate Sensor Streams" (May 2013), 27$^{th}$ International Symposium on Parallel & Distributed Processing (IPDPS), pp. 1133-1144 [retrieved from http://ieeexplore.ieee.org/abstract/document/6569891/].*

Mutschler et al., "Reliable Speculative Processing of Out-of-Order Event Streams in Generic Publish/Subscribe Middlewares" (Jun. 2013), Proceedings of the 7$^{th}$ ACM International Conference on Distributed Event-Based Systems, pp. 147-158 [retrieved from http://dl.acm.org/citation.cfm?id=2488263].*

Badrish Chandramouli et al., "High-performance dynamic pattern matching over disordered streams", Proceedings of the VLDB Endowment, vol. 3, No. 1, Sep. 17, 2010, pp. 220-231.

Mo Liu et al., "Sequence Pattern Query Processing over Out-of-Date Event Streams", Data Engineering, 2009, ICDE' 2009, IEEE 25th International Conference on, IEEE, Mar. 29, 2009, pp. 784-795.

Esther Ryvkina et al., "Revision Processing in a Stream Processing Engine: A High-Level Design", Data Engineering, 2006, ICDE' 2006, Proceedings of the 22nd International Conference on Atlanta, Apr. 2006,pp. 1-3.

Ming Li et al., "Event Stream processing with out-of-date arrival", Proc. 27th Intl. Conf. Distributed Computing Systems Workshops, 2007, pp. 67-74.

Shivnath Babu et al., Exploiting k-Constraints to Reduce Memory Overhead in Continuous Queries Over Data Streams, ACM Transactions on Database Systems, vol. 29, No. 3, Sep. 2004, pp. 545-580.

International Search Report PCT/ISA/210 for International Application No. PCT/EP2014/051538 Dated May 6, 2014.

Written Opinion of the International Searching Authority PCT/ISA/237 for International Application No. PCT/EP2014/051538 Dated May 6, 2014.

Canadian Office Action issued Dec. 21, 2016 in Canadian Application No. 2,896,853.

* cited by examiner

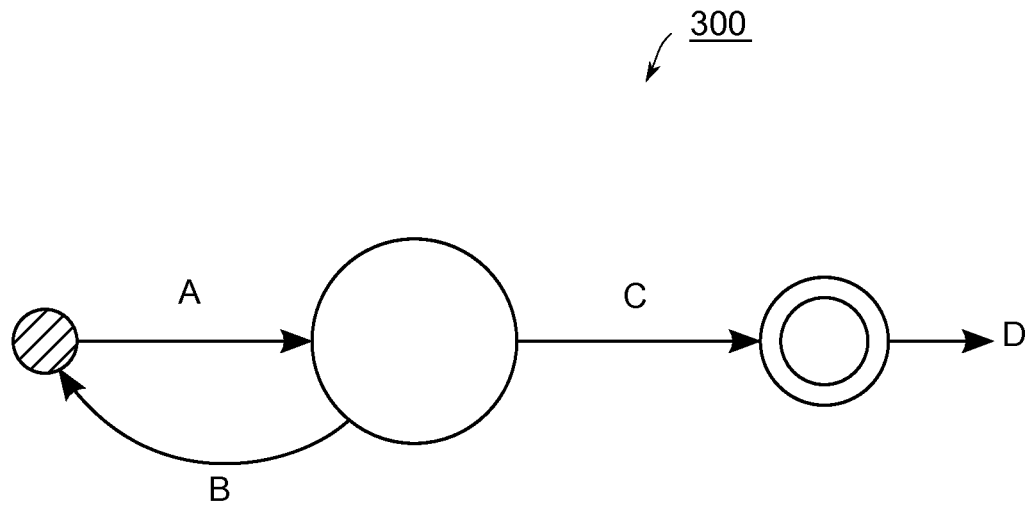
(a) Example for A ! BC.
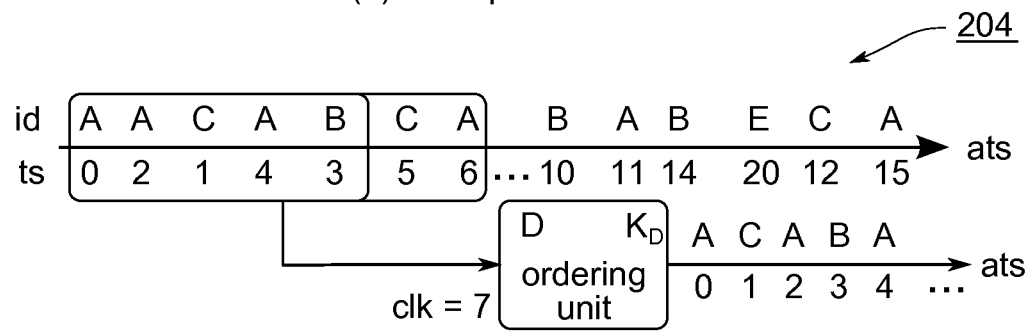
(b) Sorting window over event stream.
Fig. 3

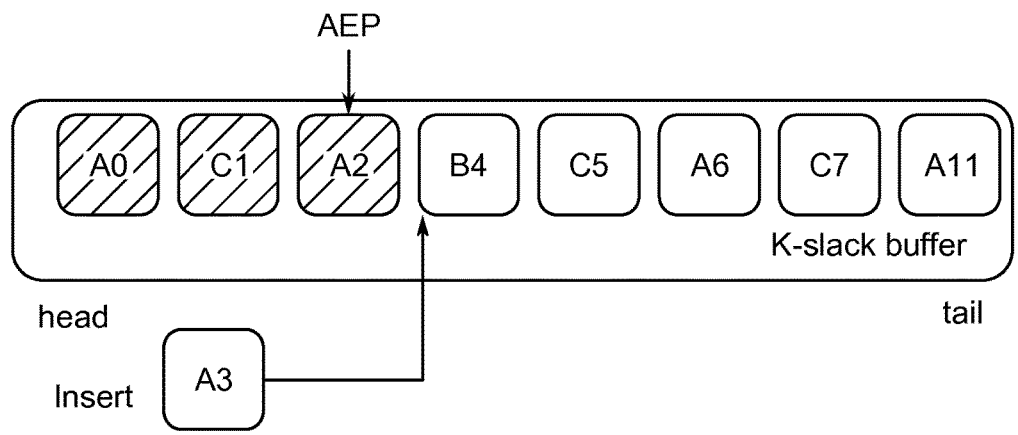
(a) Inserting C3 behind AEP.
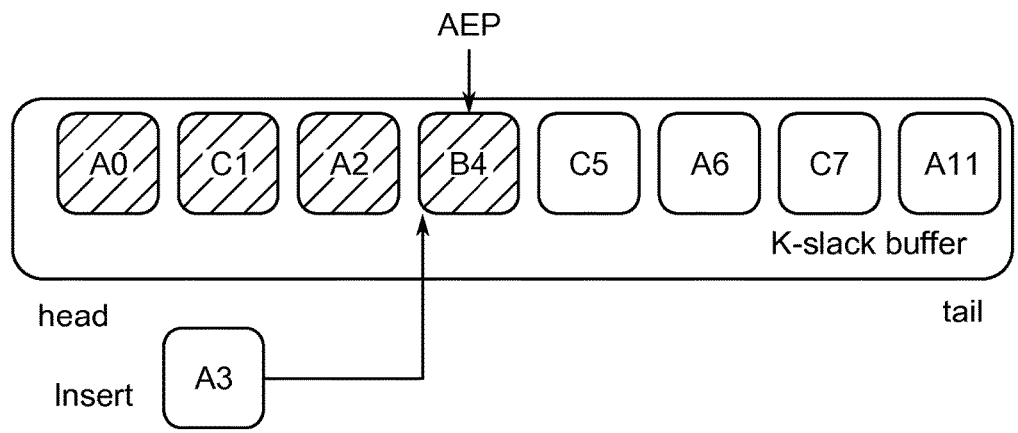
(b) Inserting C3 in front of AEP.
Fig. 6

Algorithm 1: Adding a recently received event $e$.

Data: Event $e$, OrderingBuffer *buffer*, Mutex $m$, WorkerThread *workerThread* begin
 UpdateK($e.ts$ - $clk$);  // update $K$ if needed
 while !$m.acquireLock()$ do  // lock buffer
  | *workerThread*.interrupt();
 BufferIterator $it$ ← *buffer*.tail;
 repeat
  | $it$ ← $it.previous$;
  | if $it.GetTime() \leq e.GetTime()$ then
   | *buffer*.insertAfter($it$, $e$);
   | break;
 until $it$ equals *buffer.head*;
 if $e.GetTime() < buffer.head.GetTime()$ then
  | *buffer*.push_front(*buffer.head*, $e$);
 if $AEP.ts > e.ts$ then  // it.next is snapshot
  | Event $s$ ← $it.next$.pop();
  | $s$.SetTime($e$.GetTime());  // adjust ts
  | *buffer*.insert_before($it$, $s$);  // move snapshot
  | *buffer*.emit($s$);  // re-init detector
  | *buffer*.SetAEP($it$);  // relocate AEP
 $m$.releaseLock();
 *workerThread*.wakeUp();

Fig. 8

```
Algorithm 2: Event emission, replay, and buffer purge.
Data: OrderingBuffer buffer, Mutex m, Clock clk
begin
    while true do
        if m.acquireLock() then
            while AEP ≠ buffer.tail() do
                CheckAndBreakOnInterrupt();
                if AEP.GetTime() ≤ clk - α·K then
                    SnapshotEvent s ← MakeSnapshot();
                    buffer.insert_before(AEP, s);
                    buffer.emit(AEP);
                    AEP ← AEP.next();
                    if AEP.isSnapshotEvent() then
                        AEP ← AEP.next;
                else
                    break;
            // buffer purge by K-slack constraints
            while buffer.head().GetTime + K < clk do
                if buffer.head equals null then
                    break;
                if buffer.head() not equals AEP then
                    buffer.pop_front();
                else
                    break;
            m.releaseLock();
        else
            m.sleep();
```

Fig. 10

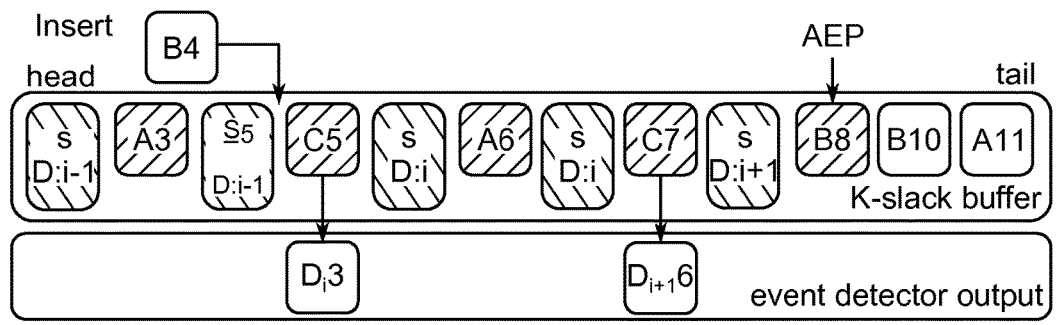
(a) D3 and D6 generated prematurely.
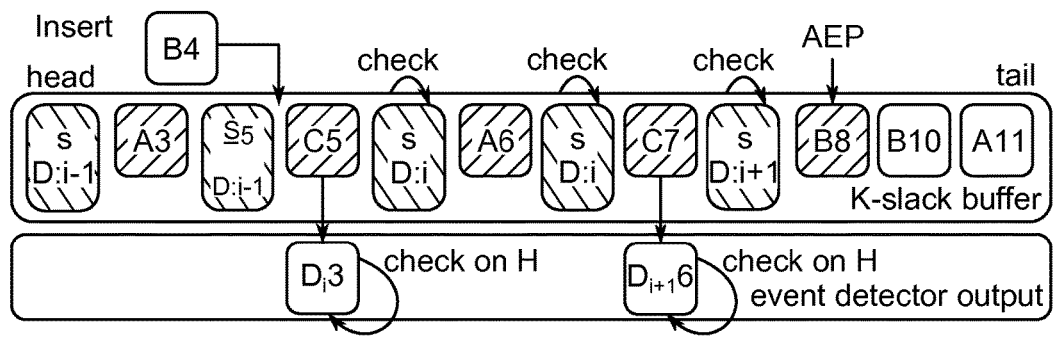
(b) On-Demand Retraction.
Fig. 11

APPARATUS, METHOD AND COMPUTER PROGRAM FOR PROCESSING OUT-OF-ORDER EVENTS

CROSS-REFERENCE TO RELATED APPLICATION(S)

This application is the National Phase under 35 U.S.C. §371 of PCT International Application No. PCT/EP2014/051538, which has an international filing date of Jan. 27, 2014, and which claims priority to European patent application number 13153525.4 filed on Jan. 31, 2013, the entire contents of all of which are incorporated herein by reference.

BACKGROUND

Field

Embodiments of the present invention generally relate to data networks and, in particular, to apparatuses and methods for processing out-of-order events, i.e. subsequent events that are received out of their original temporal order.

Description of Related Art

Sensor networks, such as, for example, wireless sensor networks, have a wide range of applications. For example, wireless sensor networks of various technologies may be used for locating purposes, such as locating humans and/or other objects. Here, "locating" means the detection or determination of a geographical location or position. Some specialized locating or position tracking systems may be used for locating players and other objects (e.g. a ball) in sport events, such as, for example, soccer, American football, rugby, tennis, etc.

With using gathered geographic location or positioning data of players and/or a ball it is possible to derive statistical information related to the whole sports event, for example a soccer match, or related to individual teams or players. Such derived statistical information may be interesting for various reasons. On the one hand, there are various commercial interests as certain statistics and their analysis may be of particular relevance for spectators in a stadium and/or in front of a television set at home. Hence, providing certain statistics may raise more interest in sport events. On the other hand, statistical data derived from the raw positioning data may as well be used for training purposes. Here, an opponent and/or the behavior of the own team may be analyzed as well as the performance and/or health condition of individual players.

The aforementioned locating or position tracking systems may be based on various technologies. For example, location information may be determined based on the evaluation of wireless radio signals and/or magnetic fields. For this purpose transmitters and/or receivers, generally also denoted as sensors, may be placed at the individual objects (e.g. players, ball, etc.) to be located by the system. Corresponding reception and/or transmission devices may also be mounted to predetermined locations around a geographical area of interest, as e.g. a soccer field. An evaluation of signal strengths, signal propagation times, and/or signal phases, just to name a few possible technical alternatives, may then lead to sensor data streams indicative of the geographic position of individual players or objects at different time instants. Typically, a geographic location data sample is associated with a timestamp indicating at which time an object was located at which geographic position. With this combined information kinematic data, like velocity (speed), acceleration, etc. may as well be provided in addition to the location data comprising, for example, x-, y-, and z-coordinates. In the sequel of this specification the location and kinematic data delivered by the localization sensor system will also be referred to as (raw) sensor data.

In a particular example of a wireless tracking system people or objects may be equipped with tiny transmitters, which may be embedded in footwear, uniforms and balls and whose signals are picked up by a number of antennas placed around the area under observation. Receiver units process the collected signals and determine their Time of Arrival (ToA) values. Based on a calculation of the differences in propagation delay, each transmitter's position is then continuously determined. In addition, a computer network integrated with the wireless tracking system may analyze the position or sensor data so as to detect specific events. Operating in the 2.4 or 5 GHz band, the tracking system is globally license-free.

Based on the raw sensor data streams outputted from the locating or position tracking system so-called "events" may be detected. Thereby an event or event type may be defined to be an instantaneous occurrence of interest at a point of time and may be defined by a unique event ID. In general, an event is associated with a change in the distribution of a related quantity that can be sensed. An event instance is an instantaneous occurrence of an event type at a distinct point in time. An event may be a primitive event, which is directly based on sensor data (kinematic data) of the tracking system, or a composite event, which is based on previously detected other events instead. That is to say, a composite event is not directly depending on raw sensor data but on other events. In ball game applications, an event may, for example, be "player X hits ball" or "player X is in possession of ball". More complicated events may, for example, be "offside" or "foul". Each event instance may have three timestamps: an occurrence, a detection, and an arrival timestamp. All timestamps are in the same discrete time domain. The occurrence timestamp ts is the time when the event has actually happened, the detection timestamp dts is the time when the event has been detected by an event detector, and the arrival timestamp ats is the time when the event was received by a particular Event Processing System (EPS) node. The occurrence and the detection timestamp are fixed for an event instance at any receiving node whereas the arrival timestamp may vary at different nodes in the network.

The detection of events (Complex Event Processing, CEP) based on underlying sensor data streams has raised increased interest in the database and distributed systems communities in the past few years. A wide range and ever growing numbers of applications nowadays, including applications as network monitoring, e-business, health-care, financial analysis, and security or the aforementioned sport-event supervision, rely on the ability to process queries over data streams that ideally take the form of time ordered series of events. Event detection denotes the fully automated processing of raw sensor data and/or events without the need of human intervention, as in many applications the vast quantity of supplied sensor data and/or events cannot be captured or processed by a human person anymore. For example, if high speed variations of players or a sports object, e.g. a ball, are to be expected, the raw sensor (locating or position tracking) data has to be determined at a sufficiently high data rate by the underlying (wireless) sensor network. Additionally, if there is a high number of players and/or objects (e.g. in soccer there are 22 players and a ball) to be tracked the amount of overall geographic location and kinematic data samples per second can become prohibitively high, in particular with respect to real-time event processing requirements.

Hence, even if raw sensor and/or event data streams are analyzed and signaled fully automated, there may still be by far too many information, which is possibly not even of any interest in its entirety. In the future this problem will even get worse as more and more devices will be equipped with sensors and the possibility to provide their determined sensor data to public networks such as the Internet for (e.g., weather or temperature data determined by wireless devices like smart phones). For this reason the amount of sensor data to be processed further into certain events of interest will rapidly grow. Automated event detection may provide remedy for this by trying to aggregate the raw sensor data piece by piece and to determine more abstract and inter-dependent events, which may transfer by far more information than the raw sensor data itself. For example, beside the aforementioned soccer-related examples, such determined events could include "car X is located at crossing Y" or "traffic jam on route X".

The problem that arises in automated event detection is the required computing power for performing event detection on possibly massively parallel sensor and/or event data streams—and all this under at least near real-time processing requirements. This problem may be solved by parallelization of event detectors, which may, for example, run on different (i.e. distributed) network nodes of a computer network, which may, for example, communicate via Ethernet. Thereby an event detector automatically extracts a certain event of interest from an event or sensor data stream according to a user's event specifications. Individual event detectors may be distributed over different network nodes of a data network, wherein the different event detectors communicate using events and/or sensor data travelling through the network using different network routes and branches. Thereby, raw sensor data and/or event may be transported in data packets according to some transport protocol, like, e.g., UDP (User Datagram Protocol), TCP (Transmission Control Protocol)/IP (Internet Protocol), etc. This concept, however, causes new problems with respect to possibly unbalanced computational load among different network nodes and with respect to the synchronization of event data streams within the network. Without suitable countermeasures the computational loads among different network nodes are unbalanced and individual sensor and/or event data streams in the network are not time-synchronized to each other, which means that individual events may reach an event detector out of their original temporal order and thereby lead to false detected results.

Let us look at an exemplary soccer-scenario, wherein a plurality of parallel automatically operating event detectors is supposed to detect a pass from player A to player B. In order to detect the "pass"-event, the following preceding event sequence is required:

1. "player A is in possession of ball",
2. "player A kicks ball",
3. "ball leaves player A",
4. "ball comes near player B",
5. "player B hits ball"

The event detection for event "player X kicks ball" may be based on the event sequence "player X near ball" and a detected acceleration peak of the ball. There are the following alternatives for setting up an automated event detector for said event "player X kicks ball":

We may wait for individual required events—one after the other. If we have seen all the required events in the correct (temporal) order (here, any abortion criterions are disregarded for the sake of simplicity) we can say that we have seen or experienced a pass. However, for complex applications the detection of all the required events does not necessarily take place on a single network node or a CPU (Central Processing Unit) due to the parallelization of event detectors. For this reason it is not necessarily guaranteed that individual required events reach the event detector in the correct required order. This may, for example, be due to network jitter, varying and/or unbalanced CPU-load or increased network load. For example, consider an event stream comprising event instances $e_1, e_2, \ldots, e_n$, with $e_k \cdot \text{ats} < e_{k+1} \cdot \text{ats}$, $(1 \leq k < n)$, i.e., the events in the event stream are sorted by their arrival time in ascending order. If any event $e_i$ and $e_j$ with $1 \leq i < j \leq n$ exists, such that $e_i \cdot \text{ts} > e_j \cdot \text{ts}$, then event $e_j$ is denoted as an out-of-order event.

Hence, we could try to buffer events and then search the buffer for the correct event pattern. But which buffer size should be used? If we say a pass has to happen within maximum 5 time units (e.g. seconds) we would have to consider events within a time period of maximum 5 time units after the first relevant event until we have either detected the pass or until we abort. However, it is also possible that the last relevant event is computationally quite complex, what requires a small additional buffer. But what is the size of this additional buffer? And what is the buffer-size related to composite event detectors that require the "pass"-event as an input event?

The K-slack algorithm of S. Babu, U. Srivastava, and J. Widom, "Exploiting k-constraints to reduce memory overhead in continuous queries over data streams," ACM Trans. Database Systems, vol. 29, pp. 545-580, 2004, is a well-known solution to deal with out-of-order events in event detection. K-slack uses a buffer of length K to make sure that an event $e_i$, can be delayed for at most K time units (K has to be known a-priori). However, in a distributed system the event signaling delays are dependent on an entire system/network configuration, i.e., the distribution of the event detectors, as well as the network- and CPU-load. Neither the final system configuration nor the load scenario may be foreseen at the time of compilation.

An approach by M. Li, M. Liu, L. Ding, E. A. Rundensteiner, and M. Mani, "Event stream processing with out-of-order data arrival," in Proc. 27th Intl. Conf. Distributed Computing Systems Workshops, (Washington, D.C.), pp. 67-74, 2007, buffers an event $e_i$ at least as long as $e_i \cdot \text{ts} + K \leq \text{clk}$. As there is no global clock in a distributed system, each node synchronizes its local clock by setting it to the largest occurrence timestamp seen so far.

An ordering unit that implements the K-slack approach applies a sliding window with a given K to the input stream, delays the events according to their timestamps, and produces an ordered output stream of events. However, a single fixed a-priori K does not work for distributed, hierarchical event detectors. As K-slack takes K time units to generate a composite event, an event detector on a higher layer that also buffers for K units and waits for the composite event, misses said event. Waiting times add up along the event detector hierarchy.

M. Liu, M. Li, D. Golovnya, E. Rundensteiner, and K. Claypool, "Sequence pattern query processing over out-of-order event streams," in Proc. 25th Intl. Conf. Data Engineering, (Shanghai, China), pp. 784-795, 2009, avoid such problems by specifying an individual K for each event detector. Each $K_n$ (n denoting the hierarchy level) must be set to a value larger than $\max(K_{n-1})$, i.e., larger than the maximum delay of all subscribed events. Thereby a subscribed event is an event of interest for the respective event detector. The event detector of hierarchy level n subscribes to an event of a lower hierarchy level in order to use it as an input to detect a higher hierarchy event. Although this sounds good at first glance, choosing proper values for all $K_j$ is difficult, application- and topologyspecific, and can only be done after careful measurements. Conservative and overly large $K_j$ result in large buffers with high memory demands and in long delays for hierarchical CEP (as delays add up). Too large $K_j$ must be avoided. In theory, for a general purpose system the smallest/best $K_j$ can only be found by means of runtime measurements as the latencies depend on the distribution of event detectors and on the concrete underlying network topology. Moreover, best $K_j$-values change at runtime when detectors migrate.

As has been explained, Event-Based Systems (EBS) may be used as the method of choice for near-real-time, reactive analysis of data streams in many fields of application, such as surveillance, sports, stock trading, RFID-systems, and fraud detection in various areas. EBS may turn the high data load into events and filter, aggregate and transform them into higher level events until they reach a level of granularity that is appropriate for an end user application or to trigger some action. Often, the performance requirements are so high that event processing needs to be distributed over several computing nodes of a distributed computing system. Many applications also demand event detection with minimal event delays. For instance, a distributed EBS may detect events to steer an autonomous camera control system to points of interest. Such a system is schematically illustrated in FIG. 1.

FIG. 1 shows an EBS 100 which is coupled to a tracking system 110 (e.g. RTLS) comprising radio transmitters 112 which may be attached to one or more objects of interest. Radio signals emitted by the transmitters 112 and carrying raw sensor data may be received via antennas 114 and forwarded to a distributed computing network 120. Computing nodes of the computing network 120 may extract primitive events from the sensor data delivered by the tracking system 110. These primitive events may be processed by one or more event detectors 130 running on one or more computing nodes of the EBS 100. Thereby, the event detectors 130 may form an event detector hierarchy, wherein event detectors 130-1, 130-2 of the lowest hierarchy level may consume sensor data and/or primitive events derived therefrom and wherein event detectors 130-3, 130-4, 130-5 of higher hierarchy levels may consume composite events, which are based on previously detected lower level events. If a certain event of interest (for example, player hitting a ball) has been detected by the EBS 100, a camera 140 may be automatically steered to capture video footage of the detected event of interest. This obviously requires low detection latency.

To process high rate event streams, the EBS 100 may split the computation over several event detectors 130-1 to 130-5, e.g. linked by publish-subscribe to build an event detection hierarchy. These event detectors 130 may be distributed over the available machines comprised by the computing network 120. Ignoring a wrong temporal order caused by different event propagation delays at the event detectors 130 may cause misdetection. The event detectors 130 themselves cannot reorder the events with low latency because in general event delays are unknown before runtime. Moreover, as there may also be dynamically changing application-specific delay types (like for instance a detection delay), there is no a priori optimal assignment of event detectors to available computing nodes. Hence, in a distributed EBS, middleware may deal with out-of-order events, typically without any a priori knowledge on the event detectors, their distribution, and their subscribed events. Thereby middleware commonly denotes software layer that provides services to (distributed) software applications beyond those available from the operating system.

Buffering middleware approaches may withhold the events for some time, sort them and emit them to the detector in order. The main issue is the size of the ordering buffer. If it is too small, detection fails. If it is too large, it wastes time and causes high detection latency. Note that waiting times may add up along the detection hierarchy. The best buffer size is unknown and may depend on some dynamic, unpredictable behavior. In addition, there is no need to buffer events that cannot be out of order or that can be processed out of order without any problems. Buffering middleware may be the basis of reliable event detection but is too costly for many types of events and do not benefit from faster CPUs as they are bound by the waiting times.

Speculative middleware, another approach to cope with out-of-order event arrivals, speculatively work on the raw event stream. As there is no buffering, this is faster. Whenever an out-of-order event is received, falsely emitted events may be retracted and the event stream may be replayed. The effort for event retraction and stream replay grows with the number of out-of-order events and with the depth of the event detection hierarchy. This is a non-trivial challenge for memory management, may exhaust the CPU and may cause high detection latencies or even system failures. In contrast to the aforementioned buffer-based approaches, a stronger CPU may help, but the risk of high detection latencies still remains.

Badrish Chandramouli, Jonathan Goldstein, and David Maier, "High-Performance Dynamic Pattern Matching over Disordered Streams", in Proceedings of the VLDB Endowment, volume 3, pages 220-231, Singapore, 2010, permit stream revisions by using punctuations. They give an insertion algorithm for out-of-order events that removes invalidated sequences. However, removing invalidated sequences is not possible for highly distributed systems. Events that need to be invalidated may already be consumed/processed on other nodes. Chandramouli et al. limit speculation either by sequence numbers or by cleanse. The receiver can use the former to deduce disorder information in the rare cases when particular events are generated at stable rates. The latter only works for a punctuation-based environment, which must incorporate the event definition to limit query windows by setting the punctuation to the latest event time stamps of the event detector. However, this information cannot be used as a generic buffering extension when the middleware technique cannot access said information.

Hence, it is desirable to provide an improved approach to cope with out-of-order event arrivals.

SUMMARY

It is one finding of embodiments to combine the advantages of both buffer-based approaches and speculative approaches. Hence, embodiments are related to a novel speculative processing added to a buffering EBS. For that, (1) middleware may neither exploit event semantics nor their use by the event detectors because both of them are highly user- and application-specific.

(2) In spite of the speculation, the buffering middleware may keep event detection reliable, that is, false-positive or false-negative detection may be avoided to prevent a system failure. Hence, it is no option to use imprecise approximate methods or to discard events that would cause a system overload.

It has been found that the above problem may be solved by using buffering to sort most of the events but to let a snapshot event detector speculatively and prematurely process those events that will be emitted soon. Event detectors, i.e., their internal states and/or outputs, may be restored when a replay occurs. A degree of speculation may be adapted to suit CPU availability, ranging from full speculation on an idle CPU to plain buffering on a busy CPU. The proposed technique works without knowledge on internal event semantics, can be used for any publish-subscribe-based buffering middleware and does not use query languages or event approximation.

According to a first aspect, embodiments provide a method for ordering events of an out-of-order event stream for an event detector. The events carried by the event stream have associated thereto individual event occurrence times and individual event propagation delays, respectively, up to a maximum propagation delay of K time units. Thereby, the maximum delay K denotes the maximum delay that it takes for an event to travel to the event detector starting from its actual event occurrence. The method comprises a step of providing an event received from the event stream to an event buffer, which may also be referred to as ordering unit. Further, the method comprises a step of (temporally) ordering received events in the event buffer according to the respective occurrence times to obtain (temporally) ordered events. Also, the method comprises the step of speculatively forwarding an ordered event $e_i$, having an event occurrence time $e_i \cdot ts$ from the event buffer to the (snapshot) event detector at an (earliest) time instant clk, such that $e_i \cdot ts + \alpha*K < clk$, wherein $\alpha$ denotes a speculation quantity with $0 < \alpha < 1$. At the event detector an event may be detected based on at least one speculatively forwarded event. Also, an event occurrence time of the detected event may be set based on said at least one speculatively forwarded event. In some embodiments the event detector may set an event occurrence time of the detected event depending on an event occurrence time of the at least one forwarded event. For example, a composite event may be detected based on at least a first and a second forwarded event. The event detector may set an event occurrence time of the composite event depending on or corresponding to an event occurrence time of the forwarded first or the second event, for example, depending on which of the occurrence times of the first or the second event triggers the occurrence time of the composite event.

According to a further aspect, embodiments also provide an apparatus for ordering events of an event stream comprising out-of-order events for an event detector, wherein the events have associated thereto individual event occurrence times $e_i \cdot ts$ and individual event propagation delays up to a maximum delay of K time units. Thereby, the apparatus comprises an input configured to provide a received event from the event stream to an event buffer (ordering unit). The apparatus further comprises a sorter entity which is configured to order the received events in the buffer according to their respective occurrence times $e_i \cdot ts$ to obtain (temporally) ordered events. Also, the apparatus comprises an output which is configured to speculatively forward an ordered event $e_i$ having an event occurrence time $e_i \cdot ts$ from the event buffer to the (snapshot) event detector at an (earliest) time instant clk, such that $e_i \cdot ts + \alpha*K \leq clk$, wherein $\alpha$ denotes a speculation quantity with $0 < \alpha < 1$. Speculatively forwarding may be understood as forwarding or transmitting an event from the buffer before a buffering time corresponding to the maximum delay K has lapsed. The apparatus' event detector may be configured to detect an event based on at least one speculatively forwarded event. Also, the event detector may be configured to set an event occurrence time of the detected event based on said at least one speculatively forwarded event. In some embodiments the event detector may set an event occurrence time of the detected event depending on an event occurrence time of the at least one forwarded event. For example, the event detector may be configured to detect a composite event based on at least a first and a second forwarded event and to set an event occurrence time of the composite event depending on or corresponding to an event occurrence time of the forwarded first or the second event, for example, depending on which of the occurrence times of the first or the second event triggers the occurrence time of the composite event.

Some embodiments may comprise digital control circuits installed within the apparatus, which may be implemented in one or more computing nodes of a distributed computing network, for example. Such digital control circuitry, for example, a Digital Signal Processor (DSP), an Application-Specific Integrated Circuit (ASIC), or a general purpose computer, need to be programmed accordingly. Hence, yet further embodiments also provide a computer program having a program code for performing embodiments of the method, when the computer program is executing on a computer or a digital signal processor.

According to embodiments, an event detector may be understood as an instance of a computer program that is being executed on a node of a distributed computing system. An event detector comprises the computer program's program code and its parent activity. The distributed system may be a distributed computer network or a multi-core processor, for example. In case of a computer network, a node, that is a network node, may comprise a computer device or a processing unit, for example a CPU thereof, communicating with other network nodes via Ethernet, for example, or some other form of networking technology. That is to say, according to yet a further aspect of the present invention, it is also provided a distributed computing system for determining higher-level events based on an out-of-order lower-level event stream, which again is based on at least one (raw) sensor data stream. The distributed computing system, which may be a computer network, may comprise a plurality of distributed nodes, each having an event detector associated therewith, and at least one embodiment of an apparatus for ordering events of an out-of-order event stream.

In some embodiments, the distributed computing system or an apparatus thereof may be coupled to a locating system for locating and/or tracking objects within a predefined geographical area, wherein the locating system may provide the at least one sensor data stream to the distributed computing system, the sensor data stream carrying data being indicative of geographical positions and/or kinematic data related to the located objects. A locating system, such as a RTLS, may be based on a wireless sensor network, which has already been described in the introductory portion of this specification.

Embodiments propose using the buffering technique to delay and/or temporally order events but also speculatively process at least a portion of it. Embodiments may adapt the degree of speculation at runtime to fit the available system resources so that detection latency can become minimal. Embodiments may outperform prior art approaches on both synthetic data and real sensor data from a Real-Time Locating System (RTLS) with several thousands of out-of-order sensor events per second.

BRIEF DESCRIPTION OF THE DRAWINGS

Some embodiments of the present invention will be described in the following by way of example only, and with reference to the accompanying figures, in which FIG. 1 schematically illustrates an automatically controlled camera system based on an Event-Based System (EBS) according to an embodiment;

FIG. 3a, b show an exemplary state machine and out-of-order event stream;

FIG. 6a, b illustrates embodiments of insertions of a newly-arriving out-of-order event;

FIG. 8 shows a pseudo code for the insertion of an out-of-order event and a possibly necessary pointer relocation according to an embodiment;

FIG. 10 shows a pseudo code for a speculative emission of events according to an embodiment;

FIG. 11a, b illustrates embodiments of event retraction on reception of a newly-arriving out-of-order event;

FIG. 15 shows various load scenarios for different values of a.

DETAILED DESCRIPTION

Various example embodiments will now be described in more detail with reference to the accompanying figures in which some example embodiments are illustrated. In the figures, the thicknesses of layers and/or regions may be exaggerated for clarity.

Accordingly, while example embodiments are capable of various functional and structural modifications and alternative forms, embodiments thereof are shown by way of example in the figures and will herein be described in detail. It should be understood, however, that there is no intent to limit example embodiments to the particular functional and structural forms disclosed, but on the contrary, example embodiments are to cover all functional and structural modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same or a similar meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 2:
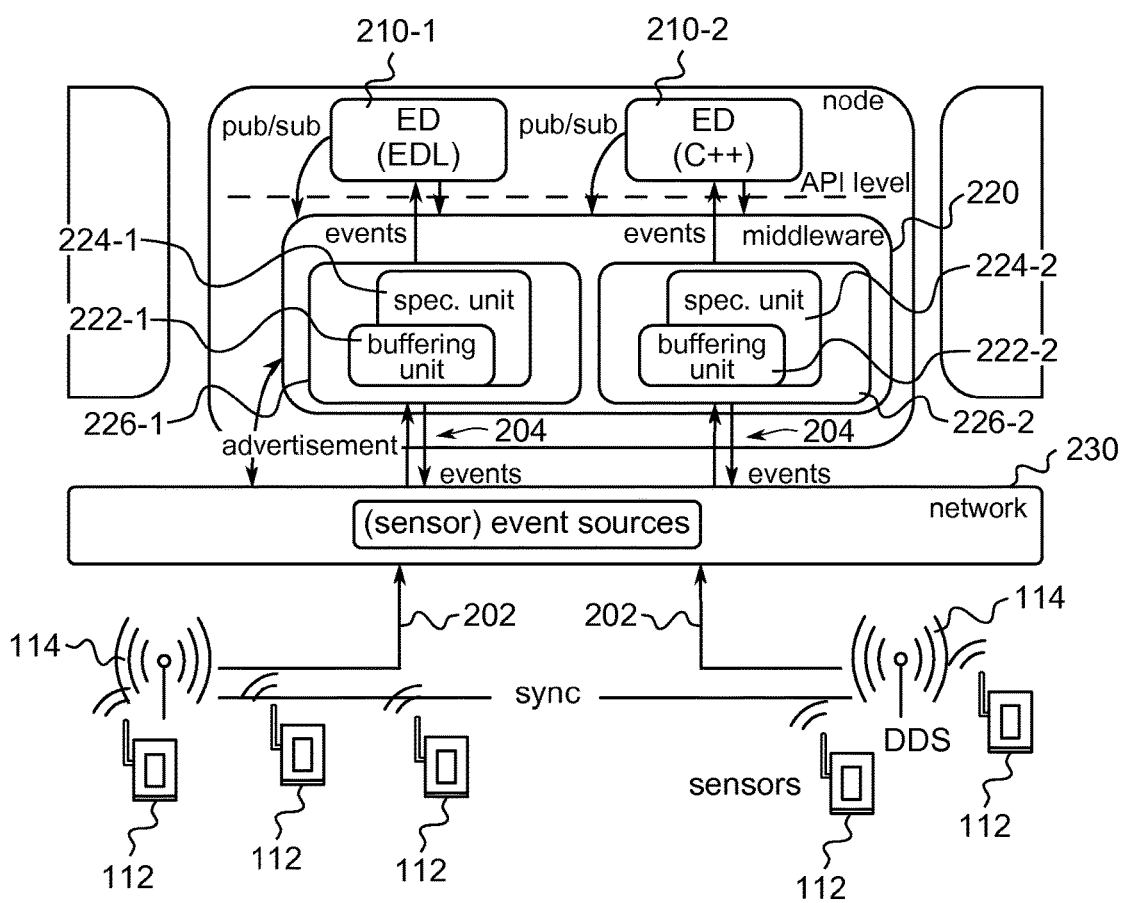
FIG. 2 illustrates a distributed publish/subscribed EBS node/system according to an embodiment.

FIG. 2 illustrates an exemplary EBS 200, which comprises several Data Distribution Devices (DDS) 114, for example, in the form of antennas that may collect sensor data 202 (for example RFID readings), and several nodes 210-1, 210-2 in a network that may run the same event processing middleware 220. The middleware 220 may create a reordering buffer 222 per event detector 210. According to embodiments this reordering buffer 222 may be wrapped by a speculation unit 224, respectively. Together the reordering buffer 222 and the speculation unit 224 form a speculative event buffer/ordering unit 226, respectively, which may also be regarded as an apparatus for ordering events of an out-of-order event stream 204, according to embodiments.

As can be seen from FIG. 2, the middleware 220 may subscribe to events 204 that are advertised by the underlying network 230 of (sensor) event sources. The subscribed events 204 may be used by the respective associated event detectors 210-1, 210-2 for detecting/determining higher level events. To determine such higher level events correctly based on the underlying subscribed events 204 from the network 230, the events from the network 230 have to be temporarily reordered by the respective speculative ordering units 226-1, 226-2. For that purpose, the middleware 220 may deal with all types of delays such as processing and networking delays or detection delays and does not need to know the complex event pattern that the associated event detectors 210-1, 210-2 implement (either in a native programming language, such as C++ or in some Event Definition Language, EDL). An event detector 210-1, 210-2 does not need to know on which machine other event detectors, such as higher level event detectors, are running, nor their run-time configurations. At start-up, the middleware 220 may have no knowledge about event delays but may notify other middleware instances about event publications and subscriptions (advertisements). The middleware 220 may therefore be generic and encapsulated.

For the following more detailed description of embodiments, the following terminology will be used: event type, instance and time stamps.

An event type defines an interesting occurrence or an occurrence of interest and may be identified by a unique event type ID.

An event instance is an instantaneous occurrence of an event type at a point in time. It can be a primitive (sensor) or a composite event, for example.

An event may have three time stamps: an occurrence time, a detection time, and an arrival time. All time stamps may be in the same discrete time domain according to our time model. An event may appear at its occurrence time stamp ts, or just time stamp for short. It may be detected at its detection time stamp dts. At arrival time stamp ats, the event may be received by a particular EBS node. The occurrence and the detection time stamp may be fixed for an event at any receiving node whereas the arrival time stamp may vary at different nodes in the network.

Consider an event stream $e_1, \ldots, e_n$. Events of a predefined type ID may be used to set a local clock associated to an event detector. Then, $e_j$ may be regarded as out-of-order if there do not exist $e_i, e_k$ with $e_i \cdot id = e_k \cdot id = ID$ and $e_i \cdot ats \le e_j \cdot ats$ so that $e_i \cdot ts \le e_j \cdot ts \le e_k \cdot ts$, i.e., $e_j \cdot ats$ does not fit between the two consecutive clock updates.

The input of an event detector may be a potentially infinite event stream that usually is a subset of all events. The event stream may hold at least the event types of interest for that particular event detector, and may include some irrelevant events as well.

Consider the following example: To detect that a player kicks a ball, we may wait for the events that a ball is near the player (A) and then, that the ball is kicked, a peak in acceleration (C). Between the two events there may not be the event that the ball leaves the player (not B), because in that case the ball would just have dropped to the ground. More formally: if we receive event A (near) and subsequently event C (acceleration peak) and not B (not near) in between, we may generate event D. In this context, FIG. 3a depicts a finite state automaton 300 for event D. To simplify, we leave out the differentiation of transmitter IDs for player identification.

An exemplified event stream 204 is depicted in FIG. 3b. The events (A, B, C, E) in the stream 300 are out-of-order and a naïve processing of the events will not lead the event detector to generate event D out of A4/C5 and will detect D out of A2/C1. Here, the notation A4 is a simplified notation for event A having an occurrence time ts=4. Similarly, C5 is an abbreviation for event C having an occurrence time ts=5.

To achieve correct event detection, the buffering middleware 220 of the EBS 200 may mount a dynamically-generated ordering unit based on K-slack between the event input stream 204 and the event detector 210. Thereby, K-slack assumes that an event $e_i$, can be delayed for at the most K time units. Hence, for a particular event detector 210 the ordering unit that takes a stream with potential out-of-order events and produces a sorted event stream, needs K to be the maximal delay in time units of all subscribed events and a K-sized buffer for event ordering. Hence, we may extract a local clock clk out of the event stream and delay both late and early events as long as necessary to avoid out-of-order event processing.

Figure 4:
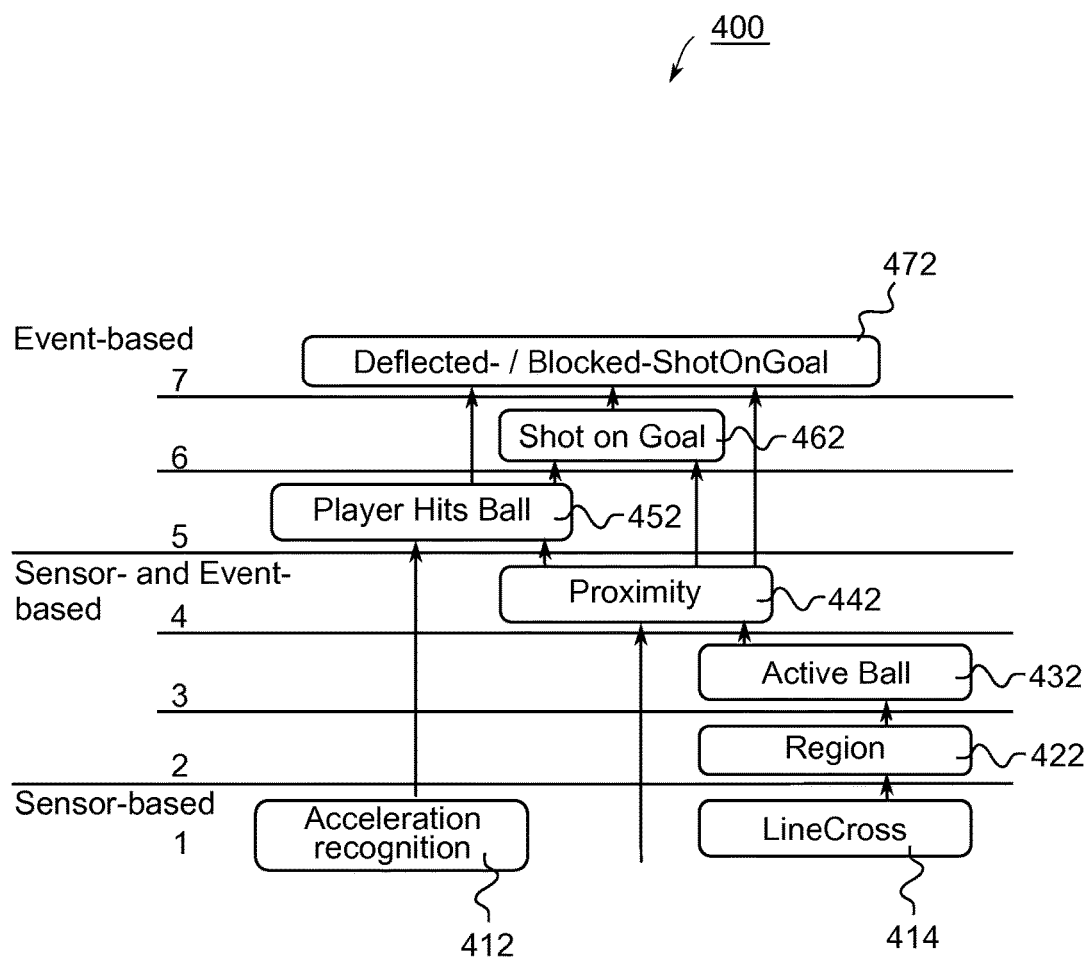
FIG. 4 exemplarily illustrates an event processing hierarchy.

In this context, FIG. 4 shows an exemplary event processing hierarchy 400 for detecting a high-level "blocked-shot on goal" event 472. As can be seen, the level-7 "blocked-shot on goal" event 472 may be based on a plurality of lower level events 412 to 462. Thereby each lower level event 412 to 462 may have associated thereto a dedicated event detector. Each event detector in this event processing hierarchy 400 may have its own dynamically parameterized ordering unit, and is configured to detect events with low latency. For instance, the "player hits ball" event detector (level 5) may implement a pattern similar to that of FIG. 3b. Its ordering unit introduces a latency of up to 1 second to guarantee an ordered event input to the detector. This delays the detection of a "shot on goal" event (level 6) for at least one second and the "blocked shot on goal" event 472 may be delayed even longer.

Even if minimal K-values for all event detectors 412 to 472 across the hierarchy 400 were used, the resulting combined or accumulated latencies may be unnecessarily high and a speculative processing could be the better option.

Assume that the example of FIG. 3b needs a minimal $K_D=3$. This delays the detection of any event in upper processing hierarchies by at least three time units since event D can only be detected with three time units delay. However, assume that events of type B are rare. Then it may be advantageous not to delay the detection of event D until we preclude the occurrence of event B, but to retract a false-detection of D in the rare cases when event B actually occurs. For the event stream depicted in FIG. 3b we may hence detect event D out of A4/C5 before clk is set to 8 (due to $K_D=3$). If there is an event B to cancel the detection of event D later we may retract D. Hence, the event detector that is used to detect event D may generate preliminary events that can be used to trigger event detectors on higher levels with lower latency. Hence, one key idea of embodiments is to combine both techniques and to let a speculation unit 224 wrap a K-slack buffer 222 to process a portion of events prematurely.

Added speculation may result in improved detection latency if there are no out-of-order events at all because nothing that an event detector emits has ever to be retracted from further up the detector hierarchy. However, the more out-of-order events there are in an event stream and the deeper the detection hierarchy is, the more complex the retraction work may be as more memory may be needed to store the detector states and as more CPU time may be needed to perform the retraction. Hence, in naïve speculation approaches the cost of purging the effects of false speculation can easily outweigh its beneficial effects and can easily increase latency beyond what pure non-speculative buffering would have cost. Therefore, embodiments propose to limit the amount of speculation so that a CPU and memory may be used at full capacity on the one side but without getting exhausted on the other side. System parameters can be deduced at run-time and a speculative ordering unit 226 can be continuously adapted to the current system and event load.

Figure 5:
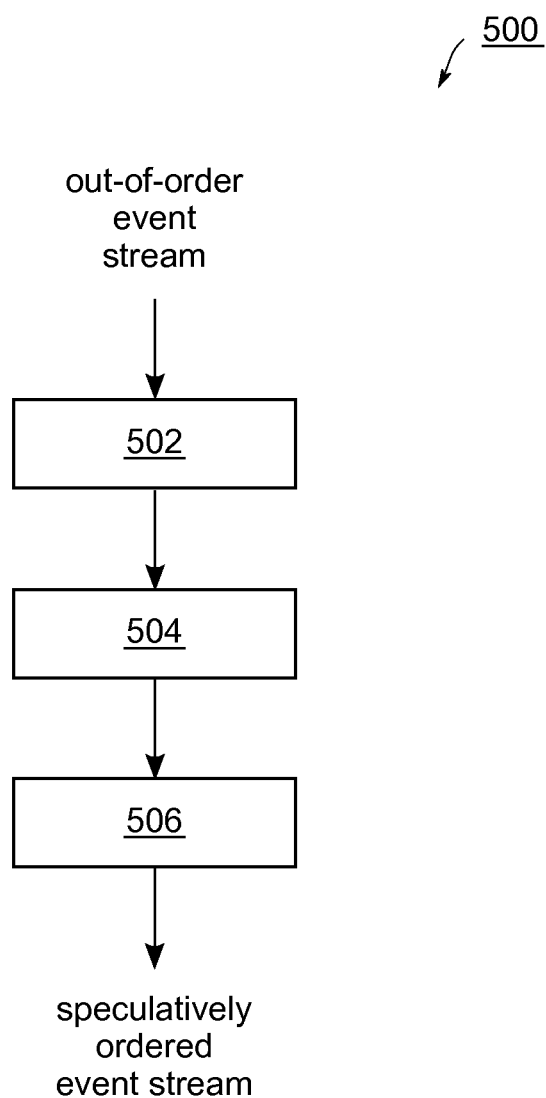
FIG. 5 schematically illustrates a flowchart of a method for ordering events of an out-of-order event stream according to an embodiment.

FIG. 5 illustrates a method 500 for ordering an out-of-order event stream 204 according to an embodiment of the present invention.

The events comprised by the event stream 204 each have associated thereto individual event occurrence times $e_i \cdot ts$ and individual event propagation delays up to a maximum propagation delay of K time units. The method 500 comprises a step 502 of providing an event received from the incoming event stream 204 to a speculative buffering unit 226. Further, the method 500 comprises a step of (temporally) ordering received events in the speculative event buffering unit 226 according to their respective occurrence times in order to obtain ordered events as has been described with respect to FIG. 3b. In a further step 506, an ordered event $e_i$ having an event occurrence time $e_i \cdot ts$ is speculatively forwarded from the speculative event buffer (ordering unit) 226 to its associated event detector 210 at an earliest time instant clk, such that $e_i \cdot ts + \alpha * K \le clk$, wherein $\alpha$ denotes a speculation quantity with $0 < \alpha < 1$. At the event detector 210 a higher level event may be detected based on at least one speculatively forwarded lower level event. Also, an event occurrence time of the detected higher level event may be set based on said at least one ordered and speculatively forwarded lower level event. For example, at the event detector 210 a composite event C may be detected based on a first event A and a second event B forwarded to the event detector 210 from the buffering unit 226. The event detector 210 may set an event occurrence time of the composite event C depending on an event occurrence time of the forwarded first event A and/or the forwarded second event B, for example, depending on which of the occurrence times of the first or the second event A, B triggers the occurrence time of the composite event C. Hence, the event detector 210 may set or reset an occurrence time (time stamp) of the composite event C depending on its input events A, B. For example, the event detector 210 may provide a composite event detected at time instant T2 with a time stamp T1 (T1<T2) of an older event contributing to the composite event. This may be relevant for more complex composite events, like "offside" in soccer, for example. This leads to a speculatively ordered event stream at the output of the speculative event buffering unit 226 for the event detector 210 after the method 500 has been performed. In the context of present embodiments speculatively forwarding means forwarding an event before the event has been delayed by the traditionally required K time units.

Speculative event processing techniques according to embodiments extend conventional K-slack buffering approaches. It may put most of the input events 204 in temporal order but it does not buffer them as required for a perfectly correct temporal order. Instead of buffering an event $e_i$ for K time units, embodiments only buffer $e_i$ as long as $$e_i \cdot ts + \alpha * K \leq clk \alpha \Sigma]0;1[, \quad (1)$$

with a new speculation quantity α. Thereby the speculation quantity α may be used to adjust the speculation component. The larger a is, the fewer events may be emitted prematurely. That is to say, if it is α=1 or α is close to 1, embodiments essentially converge towards a K-slack without speculation. Smaller values for speculation quantity α switch on speculation. That is to say, if α is 0 or close to 0, there is no or almost no buffering/ordering at all because the inequation (1) essentially holds in most cases (except for events with negative delays, which may occur if different event types are used to set the local clock clk at the speculative ordering unit 226). In general: 0<α<1. However, in some embodiments: 0.1<α<0.9.

For instance, a conventional event ordering unit with K=5 and α=1 will emit an event with ts=20 that is received at clk=22 not before clk is at least 25. Only then $e_i \cdot ts + K = 20 + 5 \leq 25 = clk$. Pure buffering middleware will not just emit the events but they will also purge them from the buffer. In the example with K=5 but with α=0.6, the speculative buffer 226 may prematurely emit the event with ts=20 already at clk=23 (20+0.6*5=23), i.e., earlier. With speculation quantity α<0.4 emission is even instantly at clk=22. According to embodiments, an event $e_i$ having the event occurrence time $e_i \cdot ts$ which is speculatively forwarded from the speculative event buffer 226 to the event detector 210 at time instant clk fulfills $e_i \cdot ts + K > clk$, if clk is always set based on the same event type.

With additional speculation, i.e., 0<α<1, events may be speculatively emitted to the event detector 210 but may no longer instantly be purged or deleted from the buffer, as they may be needed for event replay later. According to some embodiments, an event $e_i$ having an event occurrence time $e_i \cdot ts$ fulfilling $e_i \cdot ts + K \leq clk$ may be deleted from the event buffer at said time instant clk, at least if the clock signal clk has been derived always on the same event type. Hence, according to embodiments, the speculative event buffer 226 may be enhanced with an Already Emitted Pointer (AEP), which may be regarded as a reference to the last event or element in the speculative buffer 226 that has already been emitted speculatively. That is to say, the step 506 of speculatively forwarding an event may comprise keeping a pointer (AEP) to a last speculatively forwarded event in the event buffer 226.

A newly arriving event $e_i$ from the input stream 204 may be inserted into the speculative event buffer 226 according to its occurrence time stamp $e_i \cdot ts$. For instance, in FIGS. 6a and 6b a late arriving event A3 (A with ts=3) may be inserted between the already buffered events A2 (A with ts=2) and B4 (B with ts=4). The events A0, C1, and A2 from the buffer's head to the already emitted pointer (AEP) (shown shaded) have already been forwarded to the associated event detector. Depending on α, clk, K, and AEP, there are two possible cases:

$e_i \cdot ts > e_{AEP} \cdot ts$: if the time stamp of the latest arriving event $e_i$ is larger than that of AEP (A2 in the example of FIG. 6a), no false speculation has occurred and hence no event needs to be retracted or replayed. In FIG. 6a the events A0 to A2 have been prematurely or speculatively emitted, and the event A3 is not missing in the output event stream that has already been forwarded to the event detector.

$e_i \cdot ts \leq e_{AEP} \cdot ts$: if the time stamp of the newly-arriving event (here: A3) is smaller than that of the already emitted pointer (AEP) (B4 in the example of FIG. 6b), falsely emitted events may be retracted by means of concepts that will be described in the sequel. The already emitted pointer (AEP) may be set to the newly-arriving event $e_i$, and the events from the buffer's head up to the new already emitted pointer (AEP) may be replayed, i.e., retransmitted to the associated event detector. In the example of FIG. 6b, the event B4 may be retracted such that the out-of-order event A3 can be emitted prematurely before replaying B4.

Whenever the local clock signal clk at the speculative buffer 226 is updated, for example, based on a certain event type, the speculative buffer 226 may emit all events that fulfill in equation (1). Events may only be purged if a conventional non-speculative K-slack buffer would also purge or delete them, which means that an event $e_i$ having an event occurrence time $e_i \cdot ts$ fulfilling $e_i \cdot ts + K \leq clk$ may be deleted from the event buffer 226 at time instant clk.

Figure 7:
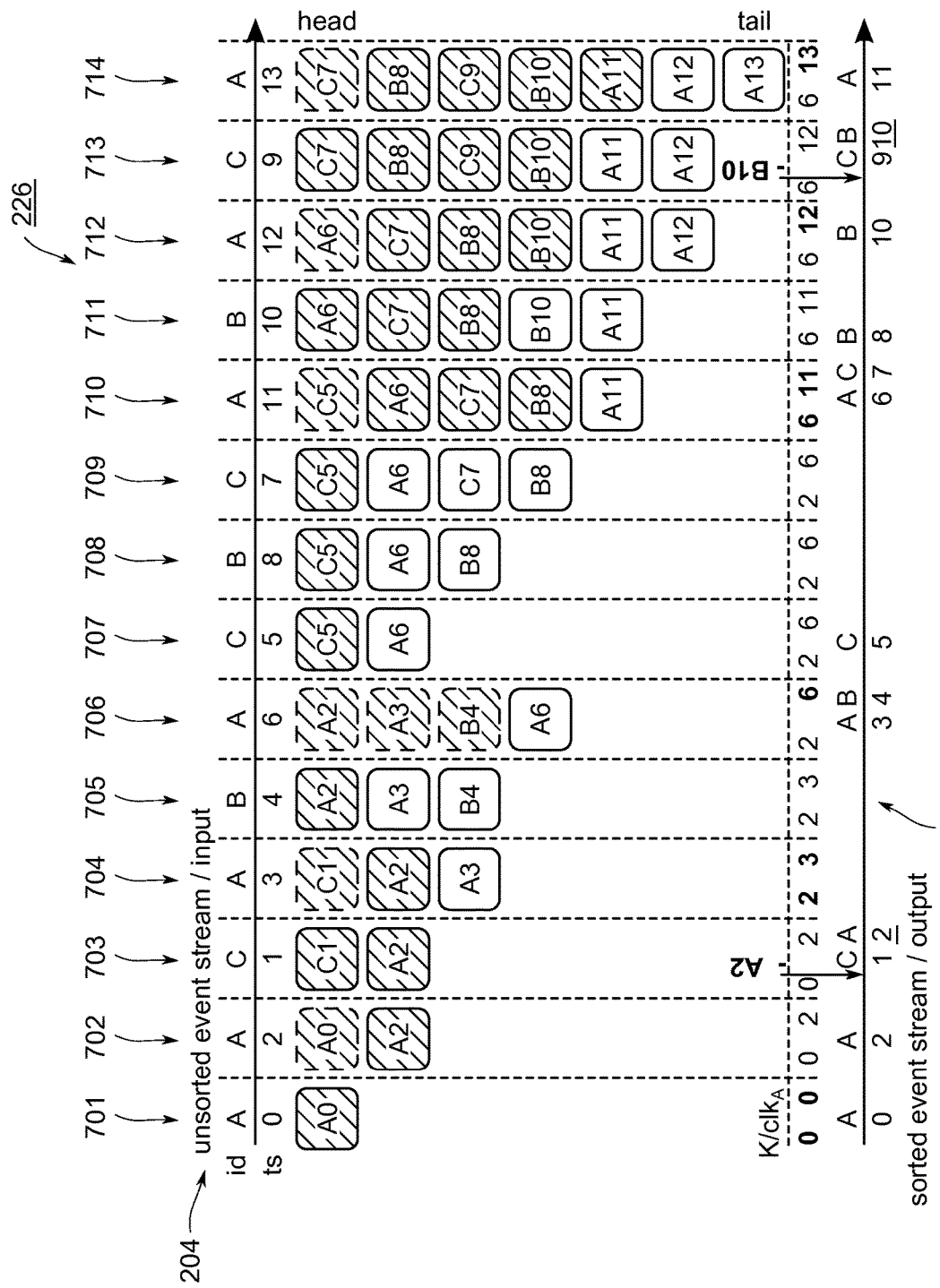
FIG. 7 exemplarily illustrates speculative ordering according to an embodiment with speculation quantity $\alpha=\frac{1}{3}$.

FIG. 7 exemplarily illustrates how the speculative buffer 226 for the event detector 210 from FIG. 3a works with speculation quantity α=⅓ and an initial K=0. The orientation of the speculative buffer 226 is now vertical, i.e., its head is on top. Exemplarily, events of type A may be used to set the internal clock $clk_A$ and K may be adjusted by means of dynamic K-slack (see the bold values in FIG. 7). Events indicated by dashed lines may be purged from the buffer 226 at the respective time instant. Prematurely or speculatively emitted events are indicated by shaded boxes. The already emitted pointer (AEP), although not explicitly visualized in FIG. 7, may point to the lowest shaded event. Retraction is indicated by negative events and arrows that point to the output stream 720 on the bottom of FIG. 7. Replayed events in the output stream 720 are depicted underlined.

At the beginning of the unsorted input event stream 204, we have no measurements of event delays, so the events A0 and A2 may be emitted speculatively at steps 701 and 702. When event C1 is received at the buffer's input at step or instant 703, it may be recognized that event A2 has been emitted incorrectly before. Therefore, the falsely speculatively forwarded event A2 may be retracted (see −A2 at step 703) by replacing the correctly ordered sub-stream, i.e., the events C1, and again A2 may be emitted again. That is to say, forwarding a retraction message from the speculative buffer 226 to the associated event detector 210 may comprise forwarding the newly-received event C1 and again the previously speculatively forwarded event A2 to the event detector 210.

In step 704 the maximum event delay K may be set to 2 as soon as event A3 arrives at the buffer's input. A3 is not yet emitted because $e_i \cdot ts + \alpha * K = 3 + \frac{1}{3} * 2 = 3.67 > 3 = clk$. In step 704 event C1 can be purged as K=2 tells us that there cannot be out-of-order events with ts<3−K=1. In step 705 the newly arriving event B4 may be inserted into the buffer. With event A6, arriving at step 706, there is a further local clk-update and the currently buffered events may be evaluated. Then, event A3 ($3.67 \leq 6 = clk_A$) and event B4 ($4.67 \leq 6 = clk_A$) may be emitted and the speculative buffer 226 may be purged by erasing each event that satisfies $e_i \cdot ts + K \leq clk$, i.e., events A2, A3 and B4 that are now safe (by means of the rules of pure K-slack). Although the local clock clk may not be updated on reception of the event C5 in step 707, we can prematurely emit C5 because it fulfills $e_i \cdot ts + \alpha * K = 5 + \frac{1}{3} * 2 = 5.67 \leq 6 = clk$, and since event A6 has not been processed before, we do not need to replay. Events B8 and C7 may both be queued until reception of event A11 in step 710. We then process A6, C7, and purge C5. With the reception of event A12, event B10 may be prematurely emitted because $e_i \cdot ts + \alpha * K = 10 + \frac{1}{3} * 6 = 12 \leq 12 = clk$ is fulfilled. In step 713, the newly-received event C9 may be inserted in front of the already emitted pointer (AEP) (pointing to B10) and thus a false speculation may be detected. Hence, the already emitted pointer (AEP) may be relocated and a retraction message (see −B10) may be forwarded to the associated event detector for initiating an event retraction procedure for said event detector and/or higher level event detectors arranged downstream to said event detector by forwarding or replaying the events C9 and B10.

Algorithm 1 depicted in FIG. 8 presents an exemplary pseudo code for the insertion of an out-of-order event and the possibly necessary AEP relocation, while the exemplary algorithm 2 of FIG. 10 gives the pseudo code for the speculative emission, i.e., the replay of events. Details of both algorithms will be described further below.

If speculation has been too hasty, the speculative ordering unit 226 may relocate the already emitted pointer (AEP) and replay the event stream. That is to say, if the event occurrence time of a newly-received event is smaller than the event occurrence time of the last speculatively forwarded event, the method 500 may further comprise a step of forwarding a retraction message from the buffer 226 to the event detector 210 for initiating an event retraction procedure for said event detector and/or higher level event detectors which are arranged downstream to said event detector 210. However, although the speculative ordering unit 226 may revise incorrect events by means of the retraction methods that will be described in more detail further below, the event detector that processes the emitted events may still be a wrong state due to these incorrect prematurely emitted events. Hence, for a replay the internal variables of the event detector 210 may be reverted to the state they had before the event detector 210 processed the first incorrect premature event. In other words, forwarding the retraction message may yield reverting or recovering a speculative internal state of the event detector 210 to a state before the event detector has processed the last speculatively-forwarded event.

Such a state recovery may be difficult because of three reasons. First, as the ordering middleware 220 may transparently handle out-of-order event streams, the event detector 210 does not even know that an ordering unit 226 exists. Second, even if the event detector 210 knows that there is a speculative ordering unit 226, and it processes retraction events to revert its state, it nevertheless has no clue about speculation quantity α and maximum event delay K, and hence how many states it needs to keep. Third, in many cases, retraction cascades, which are the core reason why limited speculation is beneficial, can be interrupted and resolved faster. This may only be possible from within the ordering middleware.

Embodiments propose to let the middleware 220 trigger both event detector state backup and recovery. On demand, the event detector 210 may be able to provide all the data that is necessary to later on be restored to this snapshot. One idea is to ask the event detector 210 for a snapshot of its internal state whenever a premature event $e_i$ is going to be emitted from the speculative buffer 226 and to insert this snapshot as an exceptional event $e_s$ with $e_s \cdot ts = e_i \cdot ts$ into the ordering buffer 226, directly in front of the prematurely emitted event $e_i$. The snapshot state $e_s$ may then represent the event detector state that has been in place before the premature event $e_i$ was prematurely or speculatively emitted. Hence, reverting to the speculative state of the event detector 210 may be based on a stored snapshot state of the event detector 210 which has been previously provided to the speculative event buffer 226 in response to the last speculatively forwarded event. Thereby, the snapshot state of the event detector 210 may be inserted into the event buffer 226 as an exceptional event $e_s$ having the same occurrence time as the last speculatively forwarded event $e_i$.

Whenever events are replayed from the speculative buffer 226 to an associated event detector 210, the detector 210 may switch back to an earlier state as soon as it receives such an exceptional event $e_s$ encapsulating that earlier internal state of the event detector 210. According to some embodiments, only the first buffered snapshot event may be emitted in a replay, i.e., the topmost one, the remaining snapshots may be skipped. During a replay, the event detectors may also be asked for snapshots, and existing snapshots in the ordering buffer 226 may be replaced by new ones. Snapshot events $e_s$ may be purged from the speculative buffer 226 like any other event, as has been described before.

Figure 9:
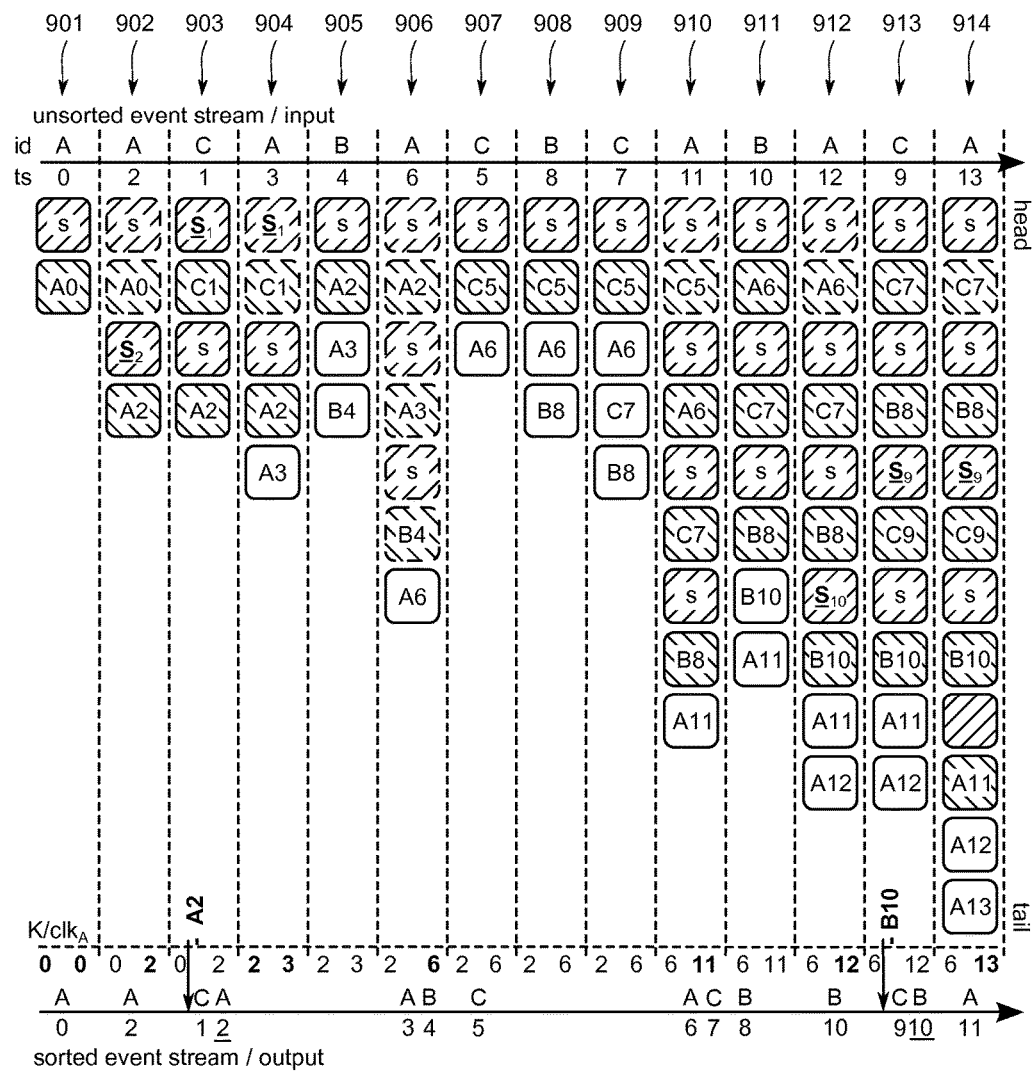
FIG. 9 illustrates a speculative ordering unit with snapshot recovery and speculation quantity $\alpha=\frac{1}{3}$ according to an embodiment.

FIG. 9 illustrates the ordering unit of FIG. 7 with additional snapshot processing. On top of each emitted shaded event there is a special snapshot event in the buffer (denoted by s). Consider the replay situation of step 903 with respect to late arriving event C1. The snapshot event $s_2$ that has been taken in step 902, when event A2 has been speculatively emitted, is still in the buffer. For the replay, this snapshot event $s_2$ is emitted first, followed by events C1 and A2 in step 903. The procedure is similar when out-of-order event C9 arrives in step 913.

If two subsequent snapshots of the same event detector 210 do not differ, embodiments may just store a reference to the prior snapshot. Nevertheless, speculation needs extra storage. The space needed grows with the degree of speculation and depends on the complexity of the event detector's state space.

Algorithms 1 and 2 of FIGS. 8 and 10 illustrate how speculation may work. Worker threads may be used that iterate over the ordering units 226 and that are used by the event detectors for event processing (Algorithm 2). While such worker threads may be busy with processing events, a new event may be received, and Algorithm 1 may be called upon reception. Since this event may be out-of-order, Algorithm 1 may acquire the lock on the ordering unit's buffer, i.e., may stop the event detector processing, insert the (out-of-order) event at its correct position, reinitialize the event detector, and relocate the AEP, if needed. With its termination it may trigger the worker thread to proceed. The worker threads may also be triggered by clk updates, and may also be used to purge the obsolete events from the buffer. Hence, Algorithm 1 may be called upon reception of a new event. Its task is to update K if appropriate, to greedy acquire the lock on the buffer, to insert the out-of-order event at its correct position, to reinitialize the event detectors, and to relocate the already emitted pointer (AEP). With its termination algorithm 1 may trigger worker threads that perform as described algorithm 2. The worker threads are triggered by both event insertion and clk updates. They may also purge the buffer by the K-slack constraints.

If some event is missing in the speculatively emitted event stream (output stream), embodiments may restore the snapshot state of the subscribing event detector 210 and replay the event stream. What remains open is that this event detector 210 may itself already have generated higher level events based on the premature and incomplete output event stream. These generated events may be retracted/eliminated from event streams subscribed by detectors on higher hierarchy levels. As this may lead to a heavy retraction cascade, embodiments aim at limiting the degree of speculation.

Consider the example event detector of FIG. 3a and the speculative buffer illustrated in FIG. 11a. The associated event detector may already have speculatively processed the shaded events A3 to B8 and may already have generated the output events $D_i3$ based on the input events A3/C5, and the output event $D_{i+1}6$ based on the input events A6/C7, when an out-of-order input event B with occurrence time stamp ts=4 arrives at the buffer's input. For this example, we assume that the event detector numbers the generated output events D, for example, $D_i3$ denotes the i-th event generated at clk=3. Hence, the subscribing event detector itself has incorrectly generated $D_i3$. Hence, we may not only restore the event detector's state and replay C5 to B8, but also retract or eliminate output event $D_i3$ from the streams of higher level event detectors, i.e., event detectors having subscribed to event D. Moreover, the output event $D_{i+1}6$ may be wrong as well because of two reasons. First, the event detector may not have reached the $D_{i+1}6$ state in presence of input event B4, because of some internal state variables that are not shown. Second, then instead of $D_{i+1}6$ it should have produced $D_i6$, i denoting the sequence number of the last emitted event D. Hence, in addition to be able to replay event streams the middleware 220 may also be ready to invalidate events that have been generated based on prematurely emitted events. According to embodiments, a correct state at a higher level event detector H may be restored by sending a retraction event or message that identifies the events that have incorrectly been generated so that H's ordering unit may fix that and replay the event stream. Below two techniques are presented to handle event retraction across the detection hierarchy: full retraction and on-demand retraction.

One idea of full retraction is to instantly retract all events that may have been generated incorrectly as soon as the already emitted pointer (AEP) is relocated. For this purpose, an event detector's speculative ordering buffer 226 may not only store the prematurely emitted events and the snapshot states of the associated event detector 210 but conceptually also hold a list of events that the event detector 210 has generated from the prematurely emitted events, i.e., $D_i3$ and $D_{i+1}6$ in the above example. Method 500 hence may comprise keeping a list of at least one event which the event detector 210 has generated based on at least one speculatively forwarded event.

When an out-of-order event is inserted or input into the speculative buffer 226, we may first collect all events that may have been incorrectly generated, and send a (conceptually) retraction message for each of them to the ordering unit of each subscribing higher level event detector H. When this ordering unit receives such a retraction message it may purge this event from its buffer and perform its own retraction and replay. Hence, a retraction message or a retraction event may entail the same replay and snapshot recovery as out-of-order events do. For instance, in FIG. 11a the newly-arriving event B4 may be inserted between A3 and C5. Instantly, retraction messages for $-D_i3$ and $-D_{i+1}6$ may be sent to tell the associated event detector to restore the appropriate snapshot and start the replay.

Although retraction of every single incorrectly generated event D would work, there may be a more efficient way to achieve the same effect. One idea is to exploit an event counter i that the speculative ordering unit 226 may attach to the event detector's state as it has been done by the event detector before. Instead of sending several retraction messages ($-D_i3$ and $-D_{i+1}6$ in the example), it may be sufficient to send the event counter D:i−1 to the upper level detector. This event detector may then purge all D-events from its buffer that have a larger counter. The event counter may not only help to reduce the number of retraction events that need to be sent to higher level detectors. With the counters stored with or in the detector states there is no longer a need to keep lists to the generated events (in the above example, there is no need for the lists C5→$D_i3$ and C7→$D_{i+1}6$).

One advantage of full retraction is that the ordering units of higher level event detectors may purge retracted events from their buffers and replay their event streams immediately.

If the event detector's state changes and/or the prematurely generated events differ, full retraction may work as efficiently as possible.

With full retraction and its purging of generated events, the event detectors have to perform their detection work again. This consumes CPU cycles. But consider stateless detectors that will generate exactly the purged events again. It is obvious that for those detectors most of the retraction work is wasted. The efficiency of the above-described full retraction strongly depends on the internal structure of the event detector and its generated events. It may introduce needless CPU overhead and hence may unnecessarily break the achievable degree of speculation.

One idea of the aforementioned on-demand retraction is not to send the retraction events immediately upon AEP relocation. Instead, the event stream may be replayed and events may only be retracted if snapshot states change and/or if detector output events are not generated again during replay. In more detail, whenever events are emitted during replay, it may be verified whether the following two properties hold:

(1) Snapshots are equal. If the event stream is replayed and the snapshots do not differ, the replay process may be aborted. Because the upcoming premature events in the replay cause the same snapshots and hence generate the same events, both the snapshots and the previously generated premature events remain valid. That is to say retraction may comprise verifying whether the stored snapshot state equals a new internal state of the event detector upon processing the newly-received event, and, if the verification is positive, aborting and event replay process for higher level event detectors.

(2) Generated events are equal. The events that are generated again during replay, i.e., event type and counter, may be marked as updates, and the ordering unit of a higher level event detector H may verify whether the previously-generated premature event equals the recently generated premature event. If it does, the ordering unit of H may not reinsert the new event, may not relocate the AEP, and hence may not trigger an unnecessary retraction cascade. In other words, the retraction process may further comprise verifying whether an output event generated by the event detector upon processing the retraction message equals a previously generated output event which has been generated in response to the last speculatively forwarded event and, if the verification is positive, aborting an event replay process for higher level event detectors.

FIG. 11b exemplarily illustrates an on-demand event retraction for the above example. When the newly-arriving event B4 is inserted into the buffer, the associated event detector may be reset to use the snapshot $s_4=s_5$ and work on the replayed events. The associated event detector will then reach some state $s_5'$ after processing B4 speculatively (not shown in FIG. 11b). If $s_5'=s_5$ (=$s_4$), i.e., if the state of the associated event detector is not effected by the late arriving event B4, replay and retraction may be aborted because all the subsequent snapshots and the prematurely generated events will remain unchanged.

However, if the state of the associated event detector is affected, the event streams may be replayed and whenever an event is generated, an update flag may be set before sending it to the ordering unit of the higher level event detector H. The ordering unit of H may then check the updated event on equality, and if it is, the event may be discarded.

If the event detector is stateless or events that cause a replay do not change much of the output, on-demand retraction may considerably reduce retraction work that would be introduced by full retraction across the event detector hierarchy.

According to embodiments speculation may require additional system resources to reduce event detection latency. A remaining question is how to set the attenuation or speculation factor α that controls the degree of speculation. An ideal value of speculation quantity α results in best latencies but also avoids exhausting the available system resources and hence system failure. Some embodiments propose a runtime α-adaptation that may achieve this goal. It is safe because when either no runtime measurements are available or when a critical situation occurs, for example, a CPU load that is higher than some threshold, α may be (re-)set to its initial value, e.g. $\alpha_0=1$, in order to prevent a system failure. Another initial value may also be $\alpha_0=0.99$ or $\alpha_0=0.9$, for example. Moreover, α-adaptation may only have local effects because α only affects replay and retraction of a single speculative ordering unit 226 (and its associated event detector 210). The CPU load on machines that run other detectors may not be affected much because the speculative buffer of an upper level event detector may only insert and/or retract events but does not start a replay which in general may depend on its own speculation factor α.

One idea of embodiments is to use a control loop for α-adaptation similar to a congestion control mechanism. Said congestion control tries to maximize throughput by doubling the data rate, i.e., a congestion window size that holds a number of to-be-acknowledged packets, at each time unit. When the data rate becomes too high for the link, data packets may be timed out because packets are lost in the network and the data rate, i.e., the window size, may be reduced to 1. The maximal window size may be saved and a new iteration begins. The window size may be doubled again until it reaches half the window size of the previous iteration. Afterwards, the window size may be incremented until again packets are lost and the next iteration starts over.

To adapt that idea, the speculation factor α may be used similarly to the congestion window size, and the CPU workload as load indicator. Whenever the CPU load is evaluated, the value of α may be adjusted. To measure the CPU load accurately, the middleware 220 may repeatedly (e.g. after each time interval $t_{span}$) sum up the times that event detectors need for event processing, i.e., $t_{busy}$, and related to a sum of the times in which each of the middleware worker threads is idle, $t_{idle}$. The resulting busy factor $b_c$ may be determined according to $$b_c = 1 - t_{idle}/t_{busy} \quad (2)$$

For instance, with an accumulated idle time $t_{idle}=0.1$ seconds and an accumulated busy time $t_{busy}=0.89$ seconds, the resulting busy factor $b_c=1-(0.1 \text{ s}/0.89 \text{ s})=0.888$. This means that 88.8% of the available resources are used and that about 12% of the system resources are still available (assuming that no other processes interfere with the EBS). The busy factor grows with decreasing values of α. To adjust α, an interval [$b_l$; $b_u$] may be specified for the lower ($b_l$) and upper target values (bu) for $b_c$. If the busy factor $b_c$ falls below $b_l$, CPU time is available and speculation quantity α may be decreased, according to some embodiments. If the busy factor is above $b_u$, CPU time is critical and α may be increased or set to its initial value $\alpha_0$. That is to say, the speculation quantity α may be adjusted based on a load of at least one computing node performing the method 500, such that speculation quantity α may be decreased with decreasing load of the computing node, and vice-versa. The speculation quantity α may again be decreased until its value is about to be set lower than $(1-\alpha_{best})/2$. From then α may no longer be decreased as quickly in order to slowly approach the target interval. That is to say, starting from an initial value, the speculation quantity α may be decreased in a first speed to reach a predetermined threshold value. After having reached said threshold value, the speculation quantity α may be further decreased in a second speed, lower than the first speed, until a target interval for the load is reached.

For example, an interval [$b_l=0.8$; $b_u=0.9$] works reasonably well in embodiments. However, the busy factor $b_c$ is not only affected by the choice of α. In burst situations or when an event detector reaches a rare area or a slow area of its state space, $t_{busy}$ may peak. In such cases the runtime α-adaptation may react appropriately by resetting speculation quantity α to its initial value $\alpha_0$ and hence by providing more computation resources to the event detector.

Figure 1:
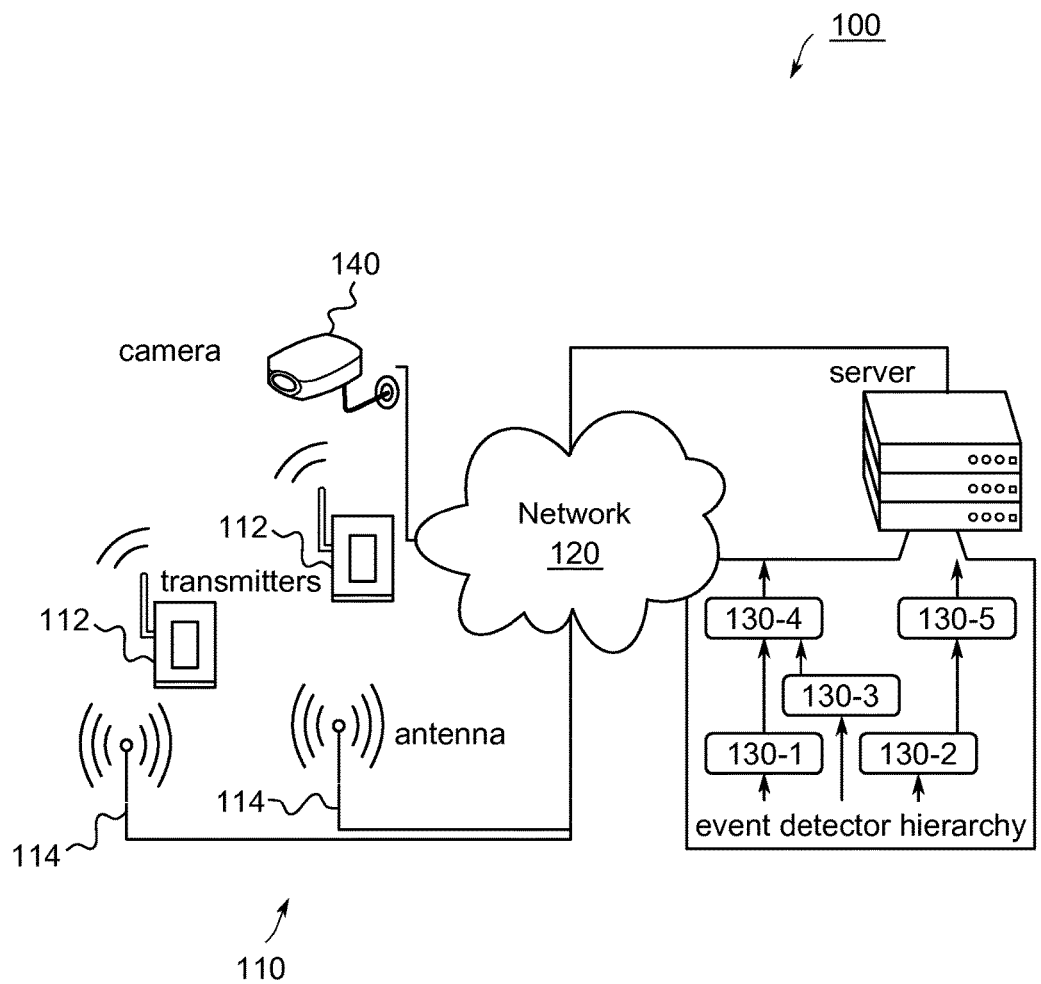

For an evaluation of embodiments, position data streams from a Real-Time Locating System (RTLS) installed in the main soccer stadium in Nuremberg, Germany, have been analyzed. This RTLS tracks 144 transmitters at the same time at 2.000 sampling points per second for the ball and 200 sampling points per second for players and referees. Each player has been equipped with four transmitters, one at each of his limbs. The sensor data comprises absolute positions in millimeters, velocity, acceleration and Quality of Location (QoL) for any location. Soccer needs these sampling rates. With 2.000 sampling points per second for the ball and a velocity of up to 150 km/h two succeeding positions may be more than 2 cm apart. Soccer events such as a pass, double-pass or shot on goal happen within a fraction of a second. A low latency is required so that a hierarchy of event detectors can help the human observer, for example, a reporter, or a camera system that should smoothly follow events of interest, to instantly work with the live output of the system (see FIG. 1, for example). Results are presented from applying an event processing system and algorithms on position data streams from the stadium according to embodiments. The used computational platform comprises several 64-bit Linux machines, each equipped with two Intel Xeon E5560 Quad Core CPUs at 2.80 GHz and 64 GB of main memory that communicate over a 1 Gbit fully switched network. For the test a test game between two amateur league football clubs has been organized. The incoming position streams from the transmitters have been processed by an EBS according to embodiments.

Figure 12:
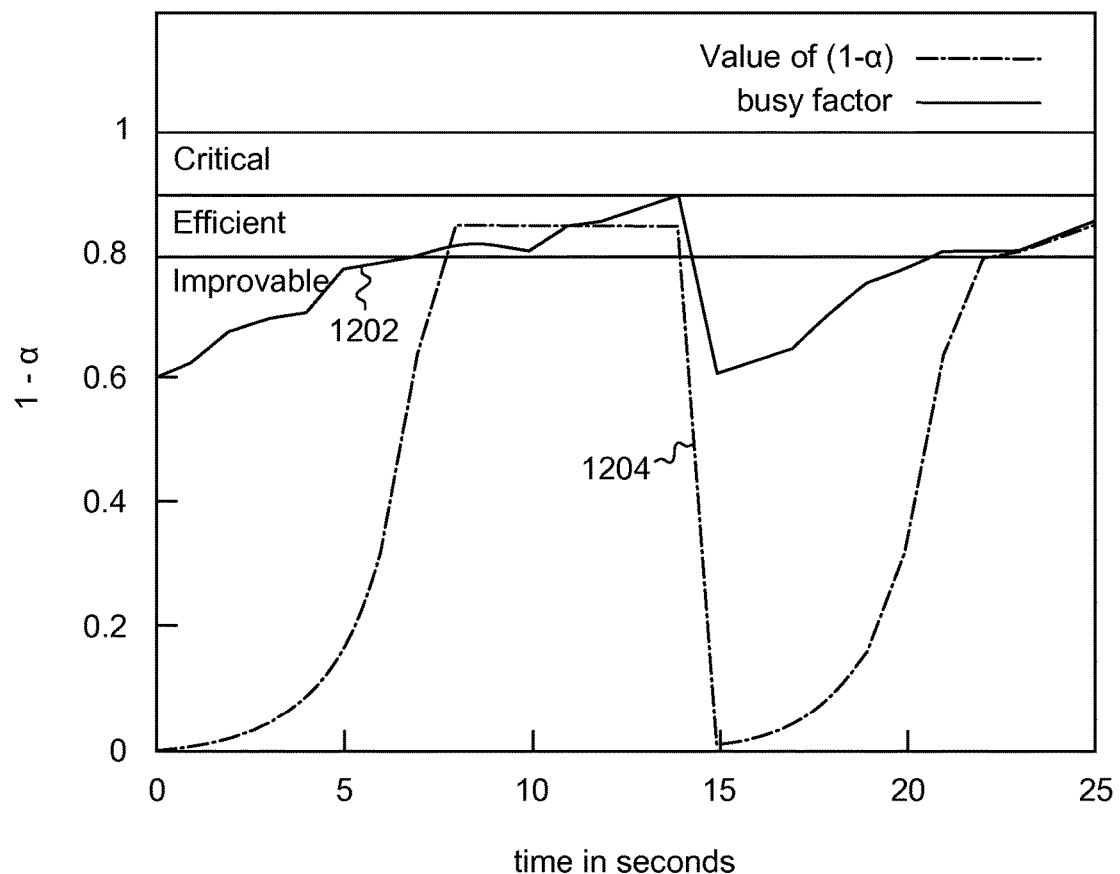
FIG. 12 illustrates an adaptation of the speculation quantity $\alpha$.

FIG. 12 depicts a diagram illustrating the busy factor $b_c$ versus time (see curve 1202) and illustrating $(1-\alpha)$ versus time (see curve 1202). As can be seen, the EBS may be started with initial speculation quantity $\alpha=1$ leading to a busy factor in the improvable load region ($b_c \approx 0.6$). Decreasing $\alpha$ from 1 to about 0.15 puts the busy factor $b_c$ in an efficient load area until it reaches a critical situation at approximately 15 seconds ($b_c \approx 0.9$). This critical load situation leads to a reset of $\alpha$ to $\alpha_0=1$, thereby decreasing the busy factor $b_c$ from approximately 0.9 to 0.6. Again, the $\alpha$-value is decreased from 1 to about 0.15, thereby continuously improving the load situation until it reaches its efficient region again.

For obtaining benchmarks we have replayed position stream data in a distributed computing cluster. Embodiments of event processing middleware, i.e., the methods for speculative processing, pub/submanagement, etc., take around 9,000 lines of C++ code. On top of that over 100 event detectors have been implemented with more than 15,000 lines of C++ code that are used to detect more than 1,500 different event types. The event detection hierarchy has 15 levels, and a snippet of the event stream from the soccer match is replayed. The duration of the test event stream is 100 seconds and comprises 875,000 position events plus 25,000 higher-level events that are generated by the event detectors (not including prematurely events or retraction events). The data stream also incorporates some burst situations. The average data rate of the processed data streams is 2.27 MBytes/sec.

Figure 13:
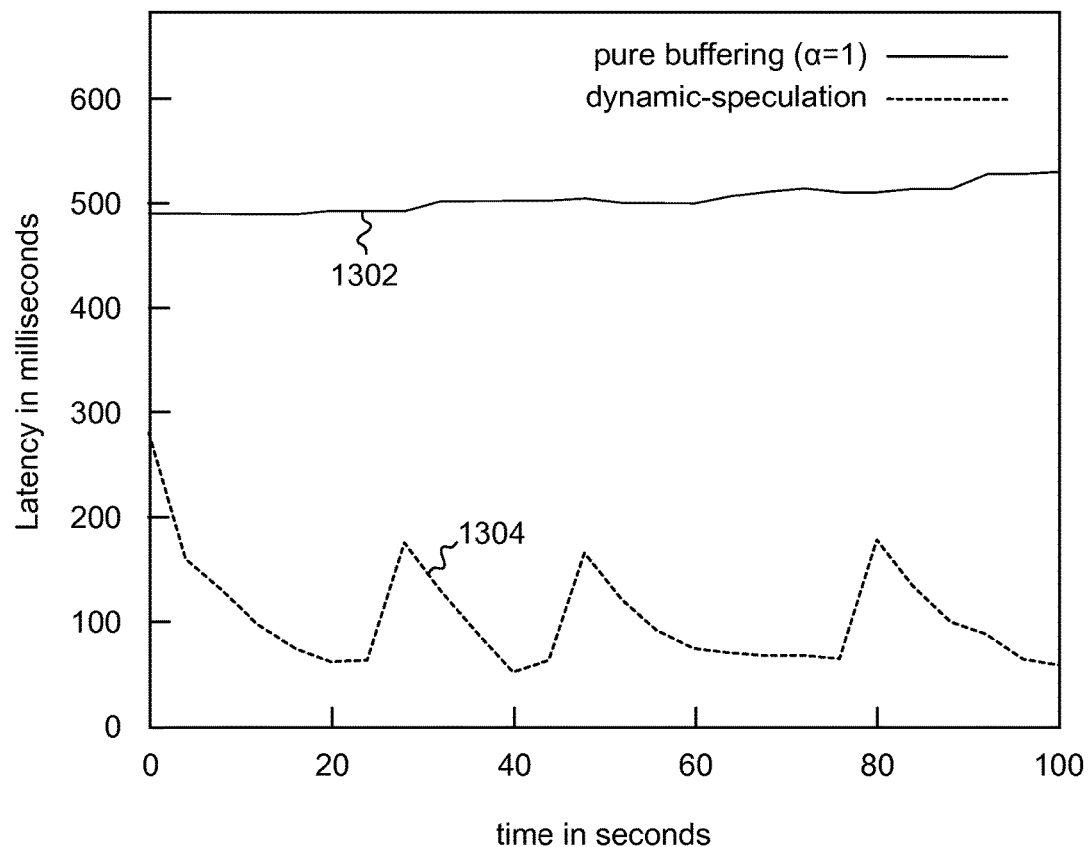
FIG. 13 shows a comparison of latencies due to plain buffering and speculative buffering according to an embodiment.

Speculation was added to reduce latency of buffering middleware. To evaluate that we use the position data streams from the recorded test match and analyze the input event delays from a "pass" event detector. This detector subscribes to 6 different event types and detects a (unsuccessful) pass event. We replay the position and event data streams twice, see FIG. 13.

Pure dynamic K-slack buffering ($\alpha=1$, reference numeral 1302) updates K upon ordering mistakes and finally ends up with a detection latency of 526 ms at the end of the stream replay. Its average latency for the 100 seconds was 504 ms. In contrast, embodiments of dynamic $\alpha$-adaptation reach a much smaller detection latency (reference numeral 1304). At the beginning, $\alpha$ starts at $\alpha_0=1$, and after the first adjustment it induces to around 300 ms of latency. During replay it is reduced as the $\alpha$-adaptation algorithm measures the system load. $\alpha$ reaches its minimum when detection latency is 64 ms. After 28 (and also 48 and 78) seconds the event streams burst, and both the busy factor and hence $\alpha$ increase, leading to an increase of the detection latency. Afterwards, $\alpha$ is lowered again so that the latency approaches its minimum. The average latency of the tested embodiment of dynamic speculation was 105 ms.

These results show that embodiments of the speculative buffering technique may strongly reduce the detection latency of events at runtime. Throughout the entire 100 seconds the CPU load was tolerable, and at the critical situations a system failure has been avoided due to $\alpha$-adaptation. Hence, camera movements and focusing can be triggered much earlier than with pure buffering techniques, i.e., less than 100 ms instead of more than 500 ms in the given example. In this test the average latency has been reduced by over 400 ms, which is more than 5× less than the latency pure buffering would induce. The latencies of other event detectors behave similar.

Figure 14:
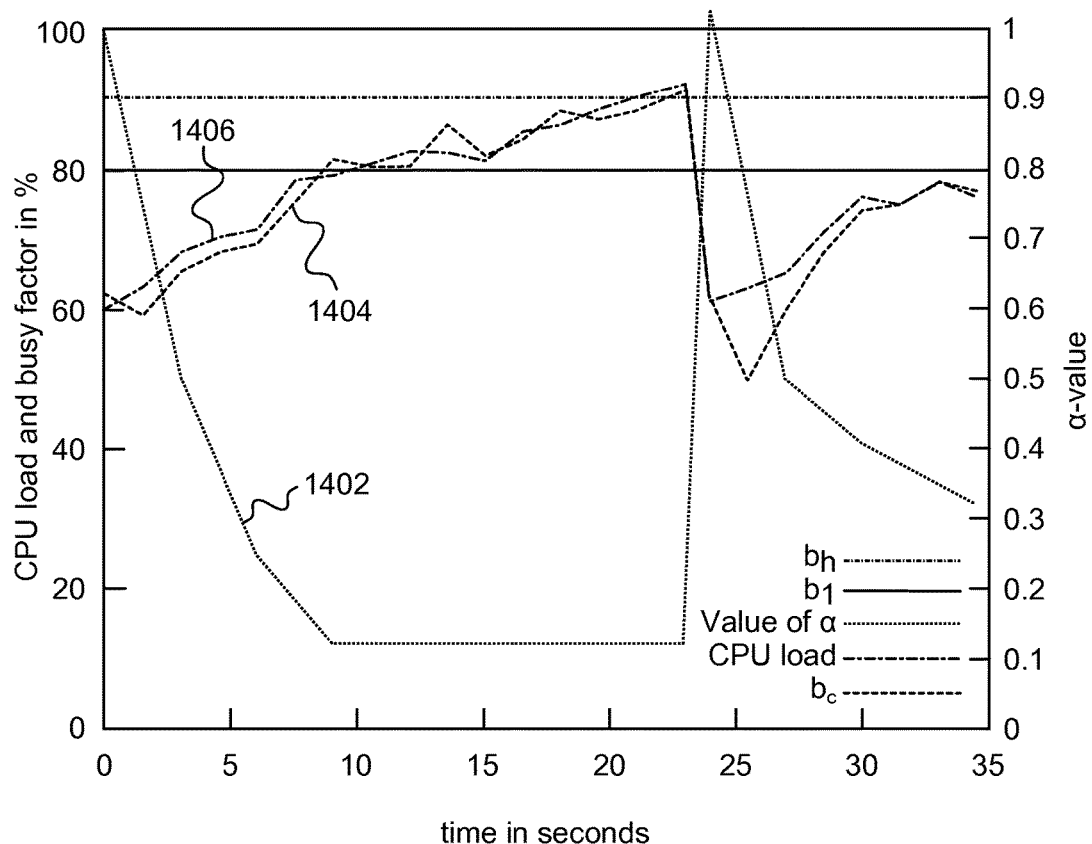
FIG. 14 illustrates a load behavior due to an adaptation of the speculation factor $\alpha$.

In the previous test we used embodiments comprising dynamic $\alpha$-adaptation to reach minimal detection latency. But there have been rare points, at which $\alpha$ has been increased due to high system load. To discuss the performance of $\alpha$-adaptation in detail, we zoom into the results from processing the first 35 seconds of the event stream, see FIG. 14.

For the test we have set the busy factor target interval to $b_c=[0.8; 0.9]$, and $\alpha$ (line 1402) starts at $\alpha_0=1$. $\alpha$ is halfed every $t_{span}=3$ seconds, and as a result the busy factor $b_c$ (line 1404) increases. After 9 seconds $b_c$ is in its target interval between $b_l=80\%$ and $b_h=90\%$, and a is no longer adjusted and stays at $\alpha=0.125$. Hence, in embodiments $0.1<\alpha<1$.

From then, both the busy factor $b_c$ and the CPU load vacillate between 80% and 90%. After additional 14 seconds (after 23 seconds of runtime) $b_c$ reaches 0.92 (the CPU load 1406 at that time was at 91%), and $\alpha$ is immediately set to its initial value $\alpha_0$. As a result both $b_c$ 1404 and the CPU load 1406 decrease instantly. Starting from time 24 $\alpha$ is again halfed until time 27. Next, $\alpha$ is about to be set lower than $(1.0-0.125)/2=0.43$ (the bisection line) and is from now only decreased for 0.05 per $t_{span}$. Both $b_c$ 1404 and the CPU load 1406 again increase to their target interval between 80% and 90%.

These results show, that embodiments with $\alpha$-adaptation algorithm not only decrease a to efficiently use available CPU power but also rapidly increase $\alpha$ (e.g. adapt $\alpha$ to 1) if the system is nearly overloaded, like for instance in burst situations. Hence, a speculative buffer may avoid system failure and can absorb load bursts quickly. Moreover, $b_c$ and the CPU load behave similar. Hence, $b_c$ is a sufficiently good indicator to deduce CPU consumption by the middleware.

Figure 15:
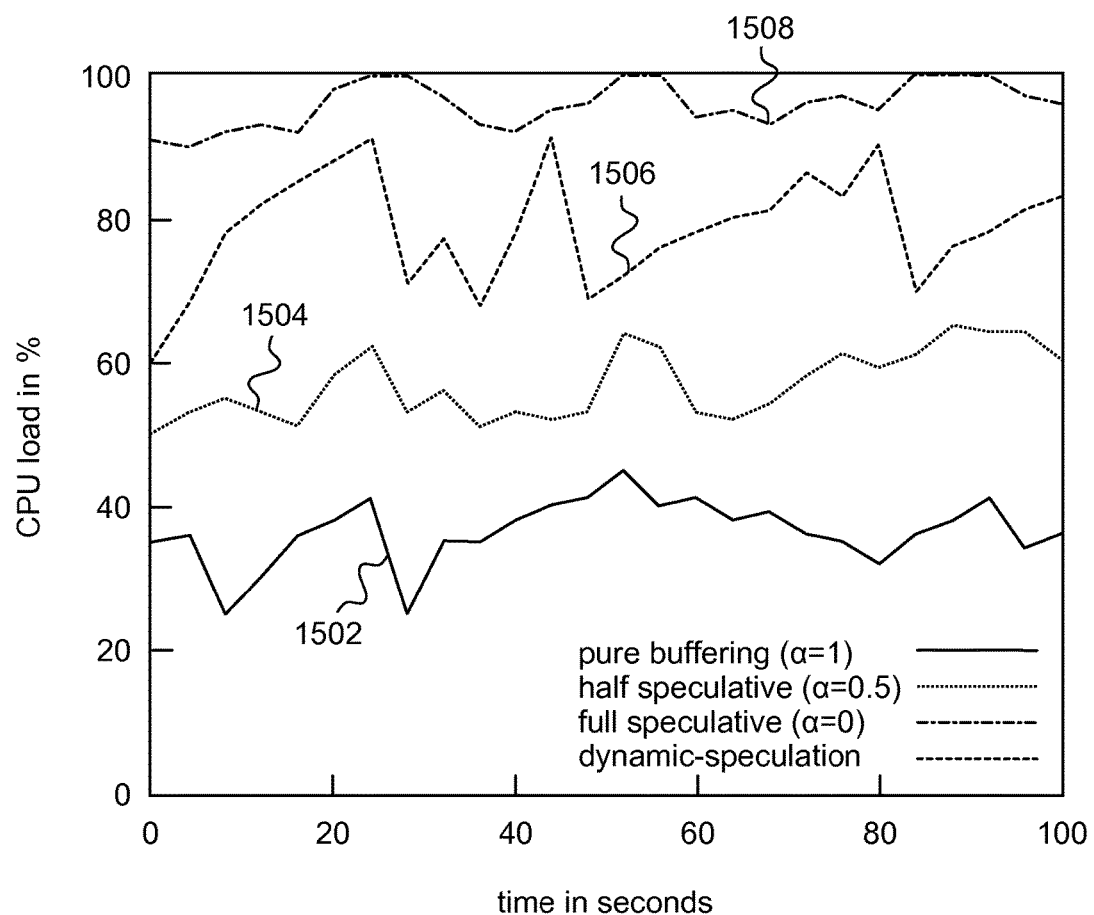

To measure the resource consumption the event stream snippet from the soccer match has been replayed four times. FIG. 15 shows the resulting CPU loads. We recorded the CPU load 1502 for pure K-slack buffering ($\alpha=1$), half speculative buffering with a static $\alpha=0.5$ (line 1504), dynamic $\alpha$-adaptation (line 1506), and full speculative processing ($\alpha=0$, line 1508). Pure buffering 1502 exhibits a lazy CPU load below 45% for the entire 100 seconds. That is because events are buffered for sufficiently long time and the event detectors neither receive retraction events nor are they asked for snapshots or get restored. In contrast, full speculation 1508 causes a high CPU consumption above 90% for the entire 100 seconds. In the benchmark the CPU consumption reaches 100% a few times, and as the event buffers increase out-of-order events are processed, event detectors are stuck in invalid states, and sometime later also buffers may overrun. The input event stream is too high and the number of events that still need to be processed steadily increases. A static α=0.5 reaches much better performance (see reference numeral 1504). The CPU load is higher than for the pure buffering approach 1502 but is not as critical as that of the full speculative buffer 1508 and is used to reduce the detection latency of the event detectors. But the best results are achieved by embodiments of dynamic speculation 1506 (i.e. varying a). The CPU load is never critical but is efficiently used over the entire 100 seconds of stream replay. Hence, the available resources are efficiently used to reduce the detection latency by increasing the degree of speculation adaptively. Embodiments may also lower the degree of speculation to avoid system failure and hence always optimally fit the speculation to any situation.

For the evaluation of the two retraction techniques we replay a real event stream from a soccer match and record the number of events that are prematurely generated and retracted during the whole game, i.e., 90 minutes.

We recorded the number of retracted events from an event detector that is used to detect that a player hits a ball, and replay the event stream twice and switch between both retraction techniques. We also use the dynamic α-adaptation. Full retraction retracts a number of 5,623 ball hit events, whereas on-demand retraction only retracts 735 events. In total, the introduced retraction cascade of full retraction retracted a total number of 117,600 events across the detector hierarchy whereas on-demand retraction only retracted 12,300 events.

Moreover, although the computation time increases for on-demand retraction by comparing snapshots and prematurely generated events, the average a value of full retraction (0.56) was 13% higher than that of on-demand retraction (0.49), which means that on-demand retraction may yield a better performance for the given detector.

But there are also rare event detectors that perform better if full-retraction is used. For instance, the detector that is used to detect a pass, changes its state nearly for any event it receives. On-demand retraction then unnecessarily takes time to compare snapshots and generated events. That time could have been used for the processing of the retraction cascade of full retraction. For that detector most of the retraction work must been done anyway. Here, full retraction retracts 819 events whereas on-demand retraction retracts 792 events. This minor improvement does not compensate the introduced CPU consumption that is used for retraction abortion.

Memory consumption also differs between the three different operating modes. With pure buffering α=1, we only need to buffer the events but not the snapshots. The average memory consumption of the buffers was only 1,420 Kbytes over the 25 seconds of event stream processing. The half-speculative α=0.5 and the dynamic speculative processing (variable α) both also need to store the snapshots of the event detector when prematurely emitting events. The event detector's state had an average size of 152 Bytes. The average buffer size of the half-speculative processing was 7,220 KBytes and the average size of the dynamic speculative processing buffers was 13,350 KBytes.

Embodiments may achieve reliable, low-latency, distributed event processing of high data rate sensor streams even under the predominance of out-of-order events. Event delays may be measured, the middleware may adapt itself at runtime and postpone events as long as necessary, put incoming event streams in order for any application-specific event detectors. No a priori knowledge of event delays is needed. Embodiments work well on RTLS in soccer applications, for example. The performance in terms of latency reduction is limited by the derivation of the clk signal. If clock updates are rare, the detection latency of events increases.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted, configured or operable for performing a certain function, respectively. Hence, a "means for s.th." may as well be understood as a "means being adapted configured or operable to do s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the invention.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

The invention claimed is:

1. A method for ordering events of an event stream including out-of-order events for an event detector, wherein the events have associated thereto individual event occurrence times and individual event propagation delays up to a maximum delay of K time units, the method comprising:
providing an event received from the event stream to an event buffer;
ordering received events in the event buffer according to their respective occurrence times to obtain ordered events;
speculatively forwarding an ordered event having an event occurrence time $e_i.ts$ from the event buffer to the event detector at an earliest time instant clk, such that $e_i.ts+\alpha*K \leq clk$, wherein $\alpha$ denotes a speculation quantity with $0<\alpha<1$; and
at the event detector, detecting an event and setting an event occurrence time of the detected event based on at least one speculatively forwarded event.

2. The method according to claim 1, wherein the speculation quantity $\alpha$ is adjusted based on a load of a computing node performing the method such that the speculation quantity $\alpha$ decreases with decreasing load of the computing node, and vice versa.

3. The method according to claim 1, wherein the speculatively forwarding an ordered event further comprises:
keeping a pointer to a last speculatively forwarded event in the event buffer.

4. The method according to claim 3, further comprising:
if the event occurrence time of a newly received event is smaller than the event occurrence time of the last speculatively forwarded event, forwarding a retraction message to the event detector for initiating an event retraction procedure for at least one of (i) said event detector and (ii) higher level event detectors arranged downstream to said event detector.

5. The method according to claim 4, wherein the forwarding a retraction message comprises:
forwarding the newly received event and the previously speculatively forwarded event to the event detector.

6. The method according to claim 4, further comprising:
reverting, in response to the forwarded retraction message, a speculative internal state of the event detector to a state before the event detector processed the last speculatively forwarded event.

7. The method according to claim 6, wherein the reverting a speculative state of the event detector is based on a stored snapshot state of the event detector, the stored snapshot having been previously provided to the event buffer in response to the last speculatively forwarded event.

8. The method according to claim 7, wherein the snapshot state of the event detector is inserted into the event buffer as an exceptional event having the same occurrence time as the last speculatively forwarded event.

9. The method according to claim 7, wherein the forwarding a retraction message further comprises:
forwarding the stored snapshot state, the newly received event, and the previously speculatively forwarded event to the event detector.

10. The method according to claim 9, wherein the forwarding a retraction message further comprises:
verifying whether the stored snapshot state equals a new internal state of the event detector upon processing the newly received event; and
if the verification is positive, aborting an event replay process for the higher level event detectors.

11. The method according to claim 9, wherein the forwarding a retraction message further comprises:
verifying whether an output event generated by the event detector upon processing the retraction message equals a previously generated output event, which has been generated in response to the last speculatively forwarded event; and
if the verification is positive, aborting an event replay process for the higher level event detectors.

12. The method according to claim 1, further comprising:
deleting an event $e_i$ having an event occurrence time $e_i.ts$ fulfilling $e_i.ts+K \leq clk$ from the event buffer at the time instant clk.

13. The method according to claim 1, wherein at least one of the events is a primitive event, which is directly based on sensor data of a geographical localization system, or a composite event, which is based on primitive or composite events.

14. A non-transitory computer readable storage medium storing computer program code that, when executed on a computer, processor, or a programmable hardware component, causes the computer, processor or programmable hardware component to perform a method for ordering events of an event stream including out-of-order events for an event detector, wherein the events have associated thereto individual event occurrence times and individual event propagation delays up to a maximum delay of K time units, the method comprising:
providing an event received from the event stream to an event buffer;
ordering received events in the event buffer according to their respective occurrence times to obtain ordered events;
speculatively forwarding an ordered event having an event occurrence time $e_i.ts$ from the event buffer to the event detector at an earliest time instant clk, such that $e_i.ts+\alpha*K \leq clk$, wherein $\alpha$ denotes a speculation quantity with $0<\alpha<1$; and
at the event detector, detecting an event and setting an event occurrence time of the detected event based on at least one speculatively forwarded event.

15. An apparatus for ordering events of an event stream including out-of-order events for an event detector, wherein the events have associated thereto individual event occurrence times and individual event propagation delays up to a maximum delay of K time units, the apparatus comprising:
an input configured to provide an event received from the event stream to an event buffer;
a sorter configured to order received events in the event buffer according to their respective occurrence times to obtain ordered events;
an output configured to speculatively forward an ordered event having an event occurrence time $e_i.ts$ from the event buffer to the event detector at an earliest time instant clk, such that $e_i \cdot ts + \alpha * K \leq clk$, wherein $\alpha$ denotes a speculation quantity with $0 < \alpha < 1$; and the event detector configured to detect an event and set an event occurrence time of the detected event based on at least one speculatively forwarded event.

16. The method of claim 1, wherein the ordering received events comprises:

temporally ordering the received events in the event buffer according to their respective occurrence times to recreate an original temporal order of the events.

17. The method of claim 1, wherein each of the events has an associated individual event occurrence time and individual event propagation delay, the individual even propagation delay being less than or equal to the maximum delay of K time units.

18. The non-transitory computer readable storage medium of claim 14, wherein the ordering received events comprises:

temporally ordering the received events in the event buffer according to their respective occurrence times to recreate an original temporal order of the events.

19. The apparatus of claim 15, wherein the sorter is further configured to temporally order the received events in the event buffer according their respective occurrence times to recreate an original temporal order of the events.

20. The apparatus of claim 15, wherein each of the events has an associated individual event occurrence time and individual event propagation delay, the individual even propagation delay being less than or equal to the maximum delay of K time units.

* * * * *